United States Patent
Schneider et al.

(10) Patent No.: US 7,266,092 B2
(45) Date of Patent: Sep. 4, 2007

(54) ADAPTIVE FREQUENCY DUPLEXING SYSTEM AND METHOD

(75) Inventors: Kevin W. Schneider, Huntsville, AL (US); Arlynn W. Wilson, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 1170 days.

(21) Appl. No.: 10/354,442

(22) Filed: Jan. 30, 2003

(65) Prior Publication Data

US 2004/0151131 A1  Aug. 5, 2004

(51) Int. Cl.
*H04B 7/00* (2006.01)
*H04B 3/20* (2006.01)
*H04M 9/08* (2006.01)

(52) U.S. Cl. .................. 370/278; 370/286; 379/406.01

(58) Field of Classification Search ........ 370/276–293, 370/466, 486; 379/406.01, 406.09, 406.13
See application file for complete search history.

(56) References Cited

U.S. PATENT DOCUMENTS

| | | | |
|---|---|---|---|
| 5,317,596 A | * | 5/1994 | Ho et al. .................... 375/232 |
| 5,521,908 A | * | 5/1996 | Younce et al. ............... 370/286 |
| 5,812,599 A | * | 9/1998 | Van Kerckhove ........... 375/260 |
| 6,160,820 A | | 12/2000 | Isaksson et al. ............ 370/480 |
| 6,215,793 B1 | | 4/2001 | Gultekin et al. ............ 370/465 |
| 6,246,716 B1 | | 6/2001 | Schneider ................... 375/220 |

* cited by examiner

*Primary Examiner*—Afsar Qureshi
(74) *Attorney, Agent, or Firm*—Thomas, Kayden, Horstemeyer, & Risley, L.L.P.

(57) ABSTRACT

A communication system and method adaptively control frequency ranges of a pair of interconnected transceivers in an effort to enhance the data rate in one direction. In this regard, a full duplex communication session is established between a first transceiver and a second transceiver. Signals having frequencies within an overlapping bandwidth are communicated between the first and second transceivers during a data phase. A transmission capacity of one of the transceivers is determined based on the communicated signals, and a comparison between this transmission capacity and a specified transmission capacity for the one transceiver is performed. A portion of the overlapping bandwidth is adaptively selected based on the comparison, and the one transceiver is prevented from transmitting signals having frequencies within the selected portion of the bandwidth during the data phase.

33 Claims, 19 Drawing Sheets

|  | CONDITION | ACTION | REFERENCE |
|---|---|---|---|
| CASE 1 | $C_{US} < C_{UR}$ | Operate in the split-band mode | FIG. 8 |
| CASE 2 | $C_{UR} < C_{UE}$ | Remove overlapping upstream carriers until $C_U$ substantially matches $C_{UR}$ | FIG. 11 |
| CASE 3 | $C_{UE} < C_{UR} < C_{US}$ | Remove overlapping downstream carriers until $C_U$ substantially matches $C_{UR}$ | FIG. 12 |

FIG. 14

ADAPTIVE FREQUENCY DUPLEXING SYSTEM AND METHOD

FIELD OF THE INVENTION

This application generally relates to data communication and, more particularly, to a system and method for adaptively adjusting the frequency of transceivers communicating in a duplexing environment in an effort to enhance the transmission capacity of one of the transceivers.

RELATED ART

The use of telecommunication channels for transmission of data has gained increased importance in personal, business and government activities. Modems, such as Asymmetric Digital Subscriber Line (ADSL) modems, experience a wide range of operating environments. Signals, in the various communication connections (e.g., twisted pairs) contained in a telephone cable, couple from connection to connection, causing crosstalk. The crosstalk between signals using the same frequencies may degrade signal performance and/or may limit the capacity (data rate) of the telephone cable.

A wide variety of loop technologies are used in the loop plant. In order to allow these technologies to co-exist in the loop plant, spectrum management standards (e.g. T1.417-2001 *Spectrum Management for Loop Transmission*) have been developed. This standard implicitly specifies transmit power limits which ensure that crosstalk will not reduce the performance of the specified basis systems below a specified level. However, since the levels of crosstalk implied by this standard are limits, they may not occur in every deployment or be seen in laboratory evaluations of equipment.

The frequency spectrum and carriers for ADSL modems, as described in T1.413-1998, have overlapping bands, in which carriers of the same frequencies are communicated in both the upstream and downstream directions. In such embodiments, the modems are referred to as operating in an "echo-cancelled (EC) mode." However, in other embodiments, the modems may operate in a frequency division duplex (FDD) mode, as defined as the "reduced NEXT" PSD definition in T1.413-1998. According to T1.413, the upstream and downstream bands are completely split (i.e., are non-overlapping).

When operating in FDD mode, modems have generally demonstrated better performance on long loops than modems that use overlapped PSDs (e.g., T1.417). This is primarily because the dynamic range requirements of the FDD mode are less, and the modem's internal noise floors can be lower. However, if other noise sources are present, such as crosstalk from non-similar systems, the operation in FDD mode may suffer in comparison to EC mode. In particular, because of its use of the higher-loss high frequency portion of the loop, the downstream performance in FDD mode may be affected by low levels of noise that are typically below the level which affects echo cancelled systems.

Moreover, a heretofore unaddressed need in the art exists for enhancing the performance of transceivers communicating in a duplexing environment.

SUMMARY OF THE INVENTION

A communication system and method adaptively control frequency ranges of a pair of interconnected transceivers in an effort to enhance the data rate in one direction. In this regard, a full duplex communication session is established between a first transceiver and a second transceiver. Signals having frequencies within an overlapping bandwidth are communicated between the first and second transceivers during a data phase. A transmission capacity of one of the transceivers is determined based on the communicated signals, and a comparison between this transmission capacity and a specified transmission capacity for the one transceiver is performed. A portion of the overlapping bandwidth is adaptively selected based on the comparison, and the one transceiver is prevented from transmitting signals having frequencies within the selected portion of the bandwidth during the data phase, thereby increasing the transmission capacity of the other transceiver.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIG. 14 illustrates is an algorithm table for use with the flow chart of FIG. 13;

DETAILED DESCRIPTION

Figure 1:
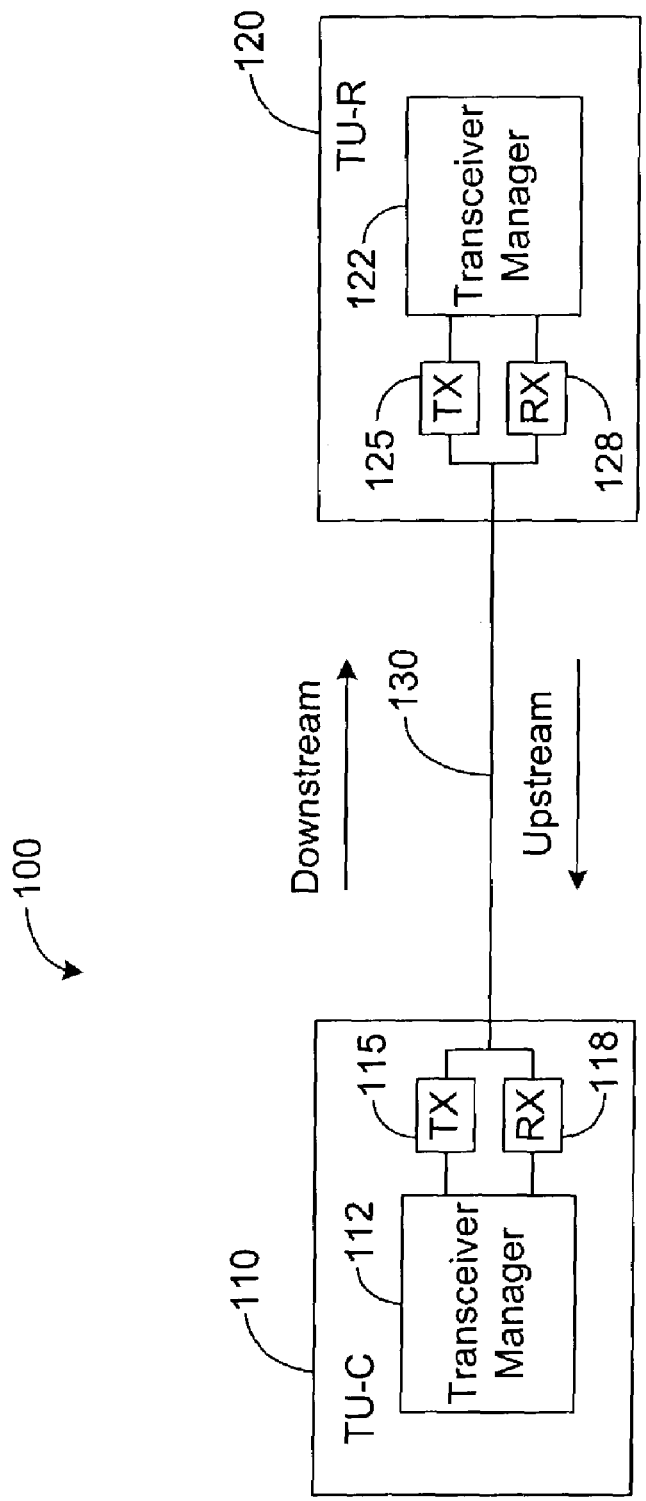
FIG. 1 is a block diagram of a communication system in accordance with a preferred embodiment of the present invention.

A central office (CO) transceiver unit 110 and a remote transceiver unit 120 can be coupled over a communication connection (e.g., a twisted pair) 130, as shown in FIG. 1. In a preferred embodiment, the central office transceiver unit (TU-C) 110 may be a central office ADSL (Asymmetrical Digital Subscriber Line) transceiver unit, and the remote transceiver unit (TU-R) 120 may be a remote ADSL transceiver unit at a customer premises, although other types of transceivers (e.g., non-ADSL) may be employed in other embodiments. Further, in other embodiments, transceiver 110 may reside at a location other than a central office. For example, the transceiver 110 may reside at a location between a central office and the remote transceiver 120.

The communication connection 130 may reside within a cable or other type of binder (not shown) along with other communication connections (not shown) for enabling communication between other transceivers (not shown). Note that the communication connections within the same binder may have a variety of lengths, gauges and impairments.

Data transmitted by the TU-C 110 preferably modulates a plurality of downstream carriers that are communicated to the TU-R 120, which recovers the data (referred to hereafter as "downstream data") from the downstream carriers. Further, the data transmitted by the TU-R 120 modulates a plurality of upstream carriers that are communicated to the TU-C 110, which recovers the data (referred to hereafter as "upstream data") from the upstream carriers. Each of the downstream and upstream carriers or tones can be modulated and communicated via techniques described in various known standards, such as T1.413 and/or T1.418, for example.

The amount of data capable of being transmitted by a carrier is typically limited depending on the signal-to-noise ratio of the carrier's channel. The maximum amount of data that a carrier can successfully communicate per unit of time is referred to as the carrier's "capacity," which is typically measured in kilobits per second (Kbps).

When a service provider furnishes a customer with data service, such as ADSL service, for example, a maximum downstream capacity and a required (minimum) upstream capacity, among other capacities, are typically specified. Values indicative of the specified upstream and downstream capacities are preferably stored in the transceiver units 110 and 120 and are utilized by the transceiver units 110 and 120 to ensure that the actual upstream and downstream capacities do not violate the specified capacities.

Note that the capacities of the transceivers 110 and 120 are affected by many factors, including the respective transmission frequency ranges of the TU-C 110 and the TU-R 120. In this regard, when a particular carrier overlaps, in frequency, with another carrier transmitted across the same communication connection in the opposite direction, the particular carrier's capacity is generally reduced primarily to interference induced by the echoes of the other carrier. In such a case, the particular carrier's capacity can be increased by removing the other carrier of the same frequency.

Moreover, in an effort to maximize or increase downstream capacity, upstream carriers that overlap in frequency with downstream carriers may be selectively removed or, in other words, prevented from being communicated over the communication connection 130 during the communication session between the TU-C 110 and TU-R 120, provided that the aforementioned specified capacities are not violated. In particular, if the upstream capacity is higher than a specified minimum upstream capacity and if the downstream capacity is less than a specified maximum downstream capacity, then overlapping upstream carriers are preferably removed, thereby reducing the upstream capacity and increasing the downstream capacity. The removal of overlapping upstream carriers preferably continues until either the upstream capacity reaches the specified minimum upstream capacity, until the downstream capacity reaches the specified maximum upstream capacity, or until no more overlapping upstream carriers are available for removal.

Note that it is possible to remove less overlapping upstream carriers in other embodiments. In other words, it is possible to terminate the removal of the upstream carriers before one of the aforedescribed conditions occurs. However, terminating the removal of overlapping upstream carriers before the upstream capacity reaches the specified minimum capacity and before the downstream capacity reaches the specified maximum downstream capacity generally causes the downstream capacity to be lower than what is otherwise possible.

Furthermore, if the upstream capacity is less than the specified minimum upstream capacity, then it may be desirable to remove overlapping downstream carriers in an attempt to increase the upstream capacity to the specified level. More specifically, overlapping downstream carriers are preferably removed until the upstream capacity reaches the specified minimum upstream capacity, until the downstream capacity reaches a specified minimum downstream capacity, or until no more overlapping downstream carriers are available for removal.

The removal of overlapping upstream and/or downstream carriers not only helps the system 100 to achieve more desirable data transmission rates, but such removal also helps to reduce crosstalk that may be occurring in other communication connections within the same cable or binder as connection 130. Techniques for removing upstream and downstream carriers in accordance with a preferred embodiment will be described in more detail below.

In the preferred embodiment, as shown by FIG. 1, the TU-C 110 comprises a transceiver manager 112 for generally controlling the operation of the TU-C 110. The TU-C 110 also comprises a transmitter 115 and a receiver 118 for communicating across the connection 130. Furthermore, the TU-R 120 preferably comprises a transceiver manager 122 for generally controlling the operation of the TU-R 120, and the TU-R 120 also comprises a transmitter 125 and a receiver 128 for communicating across the connection 130. Each of the managers 112 and 122 can be implemented via software, hardware, or a combination thereof. When implemented in software, the corresponding transceiver unit 110 or 120 preferably includes a processor, such as a digital signal processor, for example, for executing the software.

In establishing a communication session between the TU-C 110 and TU-R 120, the transceiver managers 112 and 122 preferably determine the actual transmission capacities of the transceiver units 110 and 120 via any known technique. The transceiver managers 112 and 122 then compare the actual transmission capacities to specified capacities, which are predefined (e.g., stored in memory residing within the transceiver units 110 and 120). The specified transmission capacities include at least a specified upstream capacity, which preferably represents a minimum transmission capacity for the TU-R 120, and a specified downstream capacity, which preferably represents a maximum transmission capacity for the TU-C 110.

If the actual transmission capacity of the TU-R 120 significantly exceeds the specified upstream capacity, then the transceiver manager 122 of the TU-R 120 preferably removes a sufficient number of overlapping upstream carriers such that the actual transmission capacity of the TU-R 120 substantially matches the specified upstream capacity, provided that the specified downstream capacity is not violated. Furthermore, if the actual transmission capacity of the TU-C 110 significantly exceeds the specified downstream capacity, then the transceiver manager 112 preferably removes a sufficient number of overlapping downstream carriers such that the actual transmission capacity of the TU-C 110 substantially matches the specified downstream capacity. The transceiver manager 112 also preferably removes overlapping downstream carriers if the actual transmission capacity of the TU-R 120 is below the specified upstream capacity. More specifically, the transceiver 112 preferably removes a sufficient number of overlapping downstream carriers such that the actual transmission capacity of the TU-R 120 substantially matches the specified upstream capacity. By removing overlapping carriers in the foregoing manner, the downstream capacity can be enhanced or maximized without violating the specified upstream capacity, and also crosstalk induced by the communication between the transceiver units 110 and 120 and interfering with signals on other connections in the same cable can be reduced.

Note that there are a variety of methodologies that may be employed in order to cause the removal of upstream and downstream carriers, as described above. In the preferred embodiment, the transceiver managers 112 and 122 cause the TU-C 110 and TU-R 120 to simultaneously communicate each upstream carrier and each downstream carrier, respectively, during a training phase that occurs prior to a data phase. The transceiver manager 112, via conventional techniques, determines the capacity of each upstream carrier received from the TU-R 120, and the transceiver manager 122, via conventional techniques, determines the capacity of each downstream carrier received from the TU-C 110. The transceiver manager 112 then preferably appropriately sums the capacities of each upstream carrier to determine a total upstream transmission capacity for the TU-R 120 and compares this total upstream transmission capacity to the specified upstream capacity, which is preferably stored in the memory of the TU-C 110.

If the total upstream transmission capacity for the TU-R 120 significantly exceeds the specified upstream capacity, it is possible to increase downstream capacity by removing overlapping upstream carriers without violating the specified upstream capacity. In such a case, the transceiver manager 112 of the TU-C 110 preferably instructs the transceiver manager 122 of the TU-R 120 to remove a sufficient number of overlapping upstream carriers such that the total upstream capacity of the remaining upstream carriers substantially matches the specified upstream capacity. However, if the total upstream capacity for the TU-R 120 does not significantly exceed the specified upstream capacity, then the transceiver manager 112 of the TU-C 110 preferably refrains from instructing the transceiver manager 122 of the TU-R 120 to remove any upstream carriers.

There are a variety of methodologies that may be employed by the transceiver manager 112 to instruct the transceiver manager 122 to remove one or more upstream carriers. In the preferred embodiment, the foregoing is achieved by indicating, to the transceiver manager 122, that the capacity of each of the upstream carriers to be removed is zero.

In this regard, as described above, the transceiver manager 112 selects one or more upstream carriers for removal if the total upstream transmission capacity of the TU-R 120 significantly exceeds the specified upstream capacity. The manager 112 continues selecting upstream carriers for removal until the total upstream transmission capacity of the unselected upstream carriers substantially matches the specified upstream capacity. The transceiver manager 112 then transmits, to the TU-R 120, a capacity value for each upstream carrier. The capacity value transmitted for each unselected upstream carrier preferably corresponds to the capacity of the upstream carrier, as measured by the transceiver manager 112 in the training phase. However the capacity value transmitted for each upstream carrier selected for removal preferably corresponds to zero regardless of the actual capacity measured for the carrier during the training phase.

Moreover, the transceiver manager 122 of the TU-R 120 preferably utilizes the capacity values communicated to it by the TU-C 110 to establish the data rate for each upstream carrier. That is, during the subsequent data phase, the transceiver manager 122, for each upstream carrier, communicates at the data rate specified by the transceiver manager 112. Thus, for the carriers selected for removal by the manager 112, the transceiver manager 122 of the TU-R 120 refrains from modulating such carriers with data during the data phase, and the TU-R 120 reduces or, more preferably, zeroes the amplitude of such carriers for upstream transmission.

Note that, if the total upstream transmission capacity for the TU-R 120 falls below the specified upstream capacity, then the transceiver manager 112 may be configured to remove one or more overlapping downstream carriers in an attempt to increase or maximize the total upstream transmission capacity for the TU-R 120. More particularly, the transceiver manager 112 preferably removes a sufficient number of overlapping downstream carriers such that the specified upstream capacity is not violated or such that the actual upstream transmission capacity for the TU-R 120 is at least closer to the specified upstream capacity.

It should be noted that a downstream carrier and an upstream carrier may be considered to be overlapping when they are both transmitted across the same communication connection at the same frequency or at close enough frequencies such that the presence of both carriers on the connection 130 affects each of their capacities. For example, assume that the TU-C 110, prior to the removal of any downstream carriers according to the techniques described herein, is configured to transmit carriers having frequencies within a band 171 shown by FIG. 2. Further assume that the TU-R 120, prior to the removal of any upstream carriers according to the techniques described herein, is configured to transmit carriers having frequencies within a band 173 also shown by FIG. 2.

Figure 2:
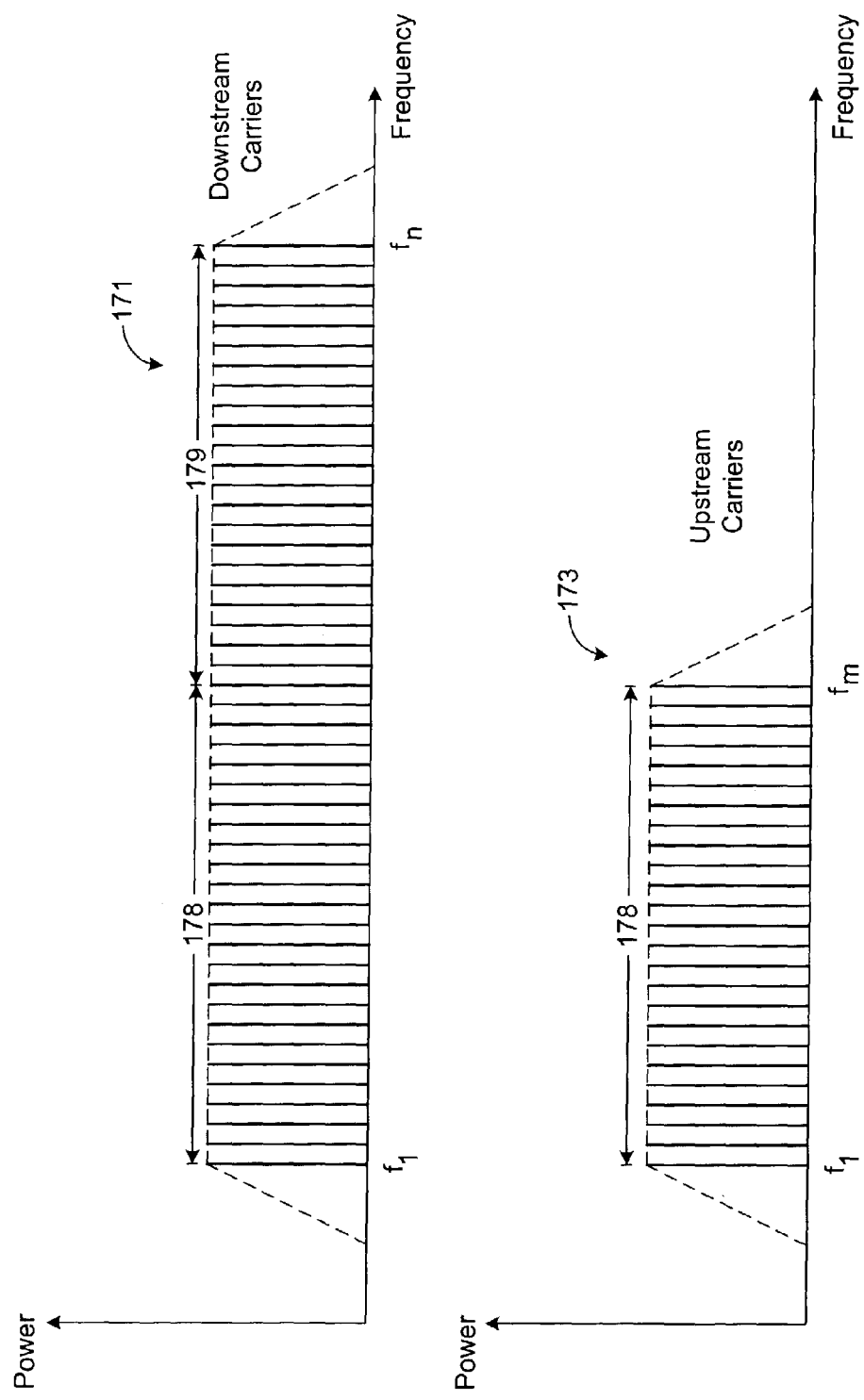
FIG. 2 illustrates exemplary downstream and upstream frequency bands for data communication by the communication system of FIG. 1.

Referring to FIG. 2, the band 171 of downstream carriers has frequencies (f) within a range of $f_1$ to $f_n$, where n is any positive integer number, and the band 173 of upstream carriers has frequencies within a range of $f_1$ to $f_m$, where m is any positive integer number. In the example shown by FIG. 2, n is greater than m, although m may be greater than n or equal to n in other embodiments. Further, it is not necessary for either of the bands 171 or 173 to begin at $f_1$, and it is not necessary for both bands 171 and 173 to begin at the same frequency. Note that bands 171 and 173 of FIG. 2 overlap from frequencies $f_1$ to $f_m$. Thus, the band from $f_1$ to $f_m$ may be referred to as "overlapping" and will be designated reference numeral 178.

In such an example, each of the downstream carriers $f_1$ through $f_n$ is preferably simultaneously transmitted along with each of the upstream carriers $f_1$ through $f_m$. Then, according to the techniques described herein, the transceiver manager 112 determines the capacity for each upstream carrier and sums these capacities to determine the total upstream transmission capacity, referred to as the "total upstream echo-cancelled capacity," for the TU-R 120. The transceiver manager 112 may then determine whether any of the upstream carriers should be removed based on at least this total echo-cancelled upstream transmission capacity and the specified upstream capacity.

In particular, the transceiver manager 112 may determine to remove one or more overlapping upstream carriers in an effort to increase downstream capacity, if the total echo-cancelled upstream capacity is greater than the specified upstream capacity. The transceiver 112 preferably continues removing overlapping upstream carriers, thereby decreasing the total echo-cancelled upstream capacity and increasing downstream capacity, until the total echo-cancelled upstream capacity reaches the specified upstream capacity. Terminating the removal process before the total echo-cancelled upstream capacity reaches the specified upstream capacity has the disadvantage of failing to maximize the downstream capacity. Further, continuing the removal of upstream carriers after the total echo-cancelled upstream capacity reaches the specified upstream capacity has the disadvantage of violating the specified upstream capacity.

In the preferred embodiment, the transceiver manager 112, in addition to calculating the total echo-cancelled upstream capacity for the TU-R 120, as described above, also calculates a total "split-band" upstream transmission capacity for the TU-R 120. In this regard, during training, the transceiver managers 112 and 122 cause the TU-C 110 and the TU-R 120 to simultaneously communicate the upstream carriers within band 178 and downstream carriers within band 179 only. In the example shown by FIG. 2, the TU-C 110 transmits downstream carriers $f_{m+1}$ through $f_n$, and the TU-R 120 simultaneously transmits upstream carriers $f_1$ through $f_m$. The transceiver manager 112, via conventional techniques, then determines the capacity of each upstream carrier received from the TU-R 120 and preferably sums the capacities of each such upstream carrier to determine the total split-band upstream capacity for the TU-R 120. The manager 112 then compares this total split-band upstream capacity to the specified upstream capacity.

Figure 3:
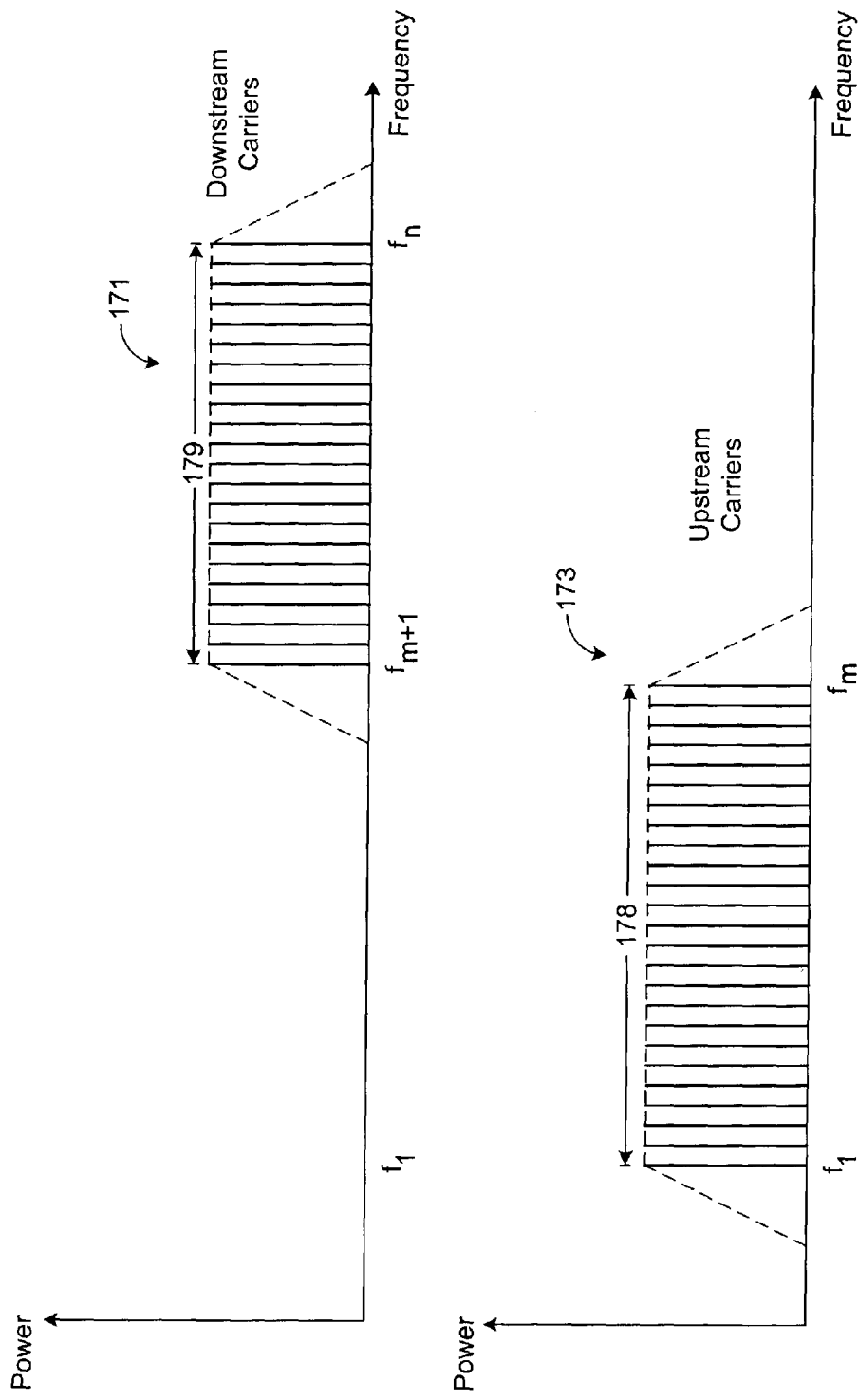
FIG. 3 illustrates exemplary downstream and upstream frequency bands for data communication by the communication system of FIG. 1 when operating in a split-band (FDD) mode.

If the total split-band upstream capacity is below the specified upstream capacity, then the transceiver manager 112 preferably removes the overlapping downstream carriers 178 for the subsequent data phase in an attempt to increase or maximize the transmission capacity of the TU-R 120 during the data phase. As a result, the transmission downstream and upstream frequency bands 171 and 173, during the data phase, appear as shown by FIG. 3. In this regard, removing the overlapping downstream carriers 178 prevents these carriers and, more specifically, the echoes of these carriers from interfering with the upstream carriers $f_1$ through $f_m$, thereby helping to increase the capacities of these upstream carriers. Note that the transceiver manager 112 may remove the overlapping downstream carriers 178 by setting their capacity or data rate to zero regardless of the actual capacities for these carriers, as measured by the TU-R 120.

If the total split-band upstream capacity is higher than the specified upstream capacity and the total echo-cancelled upstream capacity is lower than the specified upstream capacity, then the transceiver manager 112 preferably removes overlapping downstream carriers, thereby increasing the total echo-cancelled upstream capacity, until the total echo-cancelled upstream capacity reaches the specified upstream capacity. In this regard, referring to FIG. 2, the transceiver manager 112 continues selecting and removing overlapping downstream carriers within the range from $f_1$ to $f_m$ until the foregoing condition is satisfied. Terminating the removal process before the total echo-cancelled upstream capacity reaches the specified upstream capacity has the disadvantage of realizing an upstream capacity that violates the specified upstream capacity during the data phase. Further, continuing the removal of overlapping downstream carriers after the total echo-cancelled upstream capacity reaches the specified upstream capacity has the disadvantage of needlessly removing downstream carriers, thereby needlessly reducing downstream capacity. Note that the transceiver manager 112 may remove the selected overlapping downstream carriers by setting their capacity or data rate to zero regardless of the actual capacities for these carriers, as measured by the TU-R 120.

As described above, the transceiver manager 122 of the TU-R 120 preferably determines the capacity of each downstream carrier received from the TU-C 110 when the TU-C 110 and TU-R 120 are communicating each upstream and downstream carrier in the training phase. After removing upstream or downstream carriers according to the techniques described above, the transceiver manager 122 preferably sums the capacities of each remaining downstream carrier to determine a total downstream transmission capacity for the TU-C 110 and compares this total downstream transmission capacity to the specified downstream capacity, which is preferably stored in the memory of the TU-R 120.

If the total downstream transmission capacity for the TU-C 110 significantly exceeds the specified downstream capacity, then the transceiver manager 122 of the TU-R 120 preferably instructs the transceiver manager 112 of the TU-C 110 to remove a sufficient number of the downstream carriers such that the total downstream capacity of the remaining downstream carriers substantially matches the specified downstream capacity. In an effort to increase upstream capacity, the TU-R 120 preferably instructs the transceiver manager 112 to remove overlapping downstream carriers, if available, before instructing the transceiver manager 112 to remove non-overlapping downstream carriers. However, if the total downstream capacity for the TU-C 110 does not significantly exceed the specified downstream capacity, then the transceiver manager 122 of the TU-R 120 preferably refrains from instructing the transceiver manager 112 of the TU-C 110 to remove any downstream carriers.

There are a variety of methodologies that may be employed by the transceiver manager 122 to instruct the transceiver manager 112 to remove one or more downstream carriers. In the preferred embodiment, the foregoing is achieved by indicating, to the transceiver manager 112, that the capacity of each of the downstream carriers to be removed is zero based on the comparison of the total downstream capacity to the specified downstream capacity.

In this regard, the transceiver manager 122 selects one or more downstream carriers for removal if the total downstream transmission capacity of the TU-C 110 significantly exceeds the specified downstream capacity. The manager 122 continues selecting downstream carriers for removal until the total downstream transmission capacity of the unselected downstream carriers substantially matches the specified downstream capacity. The transceiver manager 122 then transmits, to the TU-C 110, a capacity value for each downstream carrier. The capacity value transmitted for each unselected downstream carrier corresponds to the capacity of the downstream carrier, as measured by the transceiver manager 122 in the training phase. However, the capacity value transmitted for each downstream carrier selected for removal preferably corresponds to zero regardless of the actual capacity measured for the carrier during the training phase.

Moreover, the transceiver manager 112 of the TU-C 110 preferably utilizes the capacity values communicated to it by the TU-R 120 to establish the data rate for each downstream carrier. That is, during the subsequent data phase, the transceiver manager 112, for each downstream carrier, communicates at the data rate specified by the transceiver manager 122. Thus, for the carriers selected for removal by the manager 122, the transceiver manager 112 of the TU-C 110 refrains from modulating such carriers with data during the data phase, and the TU-C 110 reduces and, more preferably, zeroes the amplitude of the carriers for downstream transmission.

It should be noted that, in other embodiments, it is possible for the transceiver manager 122 to perform some of the functionality described above as being performed by the transceiver manager 112, and it is possible for the transceiver manager 112 to perform some of the functionality described above as being performed by the transceiver manager 122. For example, in the preferred embodiment described above, the transceiver manager 112 of the TU-C 110 determines whether upstream carriers are to be removed based on measured upstream capacities and instructs the transceiver manager 122 of the TU-R 120 on how many bits to communicate in each upstream carrier. For each carrier to be removed, the transceiver manager 112 instructs the transceiver manager 122 to communicate zero bits.

However, in other embodiments, the transceiver manager 122 of the TU-R 120 may be configured to determine which upstream carriers should be removed. In such an embodiment, the transceiver manager 122 of the TU-R 120 may store the specified downstream transmission capacity. Furthermore, the transceiver manager 112 of the TU-C 110 may be configured to measure the capacity of each upstream carrier received from the TU-R 120 when the TU-C and TU-R are communicating in the training phase. The transceiver manager 112 may be further configured to transmit the measured upstream transmission capacities to the TU-R manager 122. The TU-R manager 122 may then determine which upstream carriers are to be removed based on the upstream transmission capacities transmitted to it by the TU-C 110. In this embodiment, the TU-R manager 122 may employ the same techniques described above for the preferred embodiment of the TU-C manager 112 in determining which upstream carriers to remove.

More specifically, the TU-R manager 122 may sum the upstream transmission capacities to derive a total upstream transmission capacity and then remove a sufficient number of upstream carriers such that the total upstream capacity of the remaining upstream carriers substantially matches the specified upstream capacity. During the subsequent data phase, the TU-R manager 122 may refrain from modulating each upstream carrier selected for removal in the training phase, and the TU-R manager 122 may reduce and, more preferably, zero the amplitude of such upstream carriers.

Note that, in the preferred embodiment, the transceiver managers 112 and 122, when removing upstream and/or downstream carriers, remove such carriers in a manner that tends to split a band of overlapping upstream and downstream carriers into at least one band of contiguous non-overlapping upstream carriers and/or at least one band of contiguous non-overlapping downstream carriers. For example, in the embodiment shown by FIG. 2, a band 178 of overlapping upstream and downstream carriers exists from $f_1$ to $f_m$. Moreover, when the transceiver managers 112 and 122 remove carriers, the managers 112 and 122 preferably remove the carriers in a manner that tends to split the overlapping band 178 into separate bands of non-overlapping upstream and/or downstream carriers.

Figure 4:
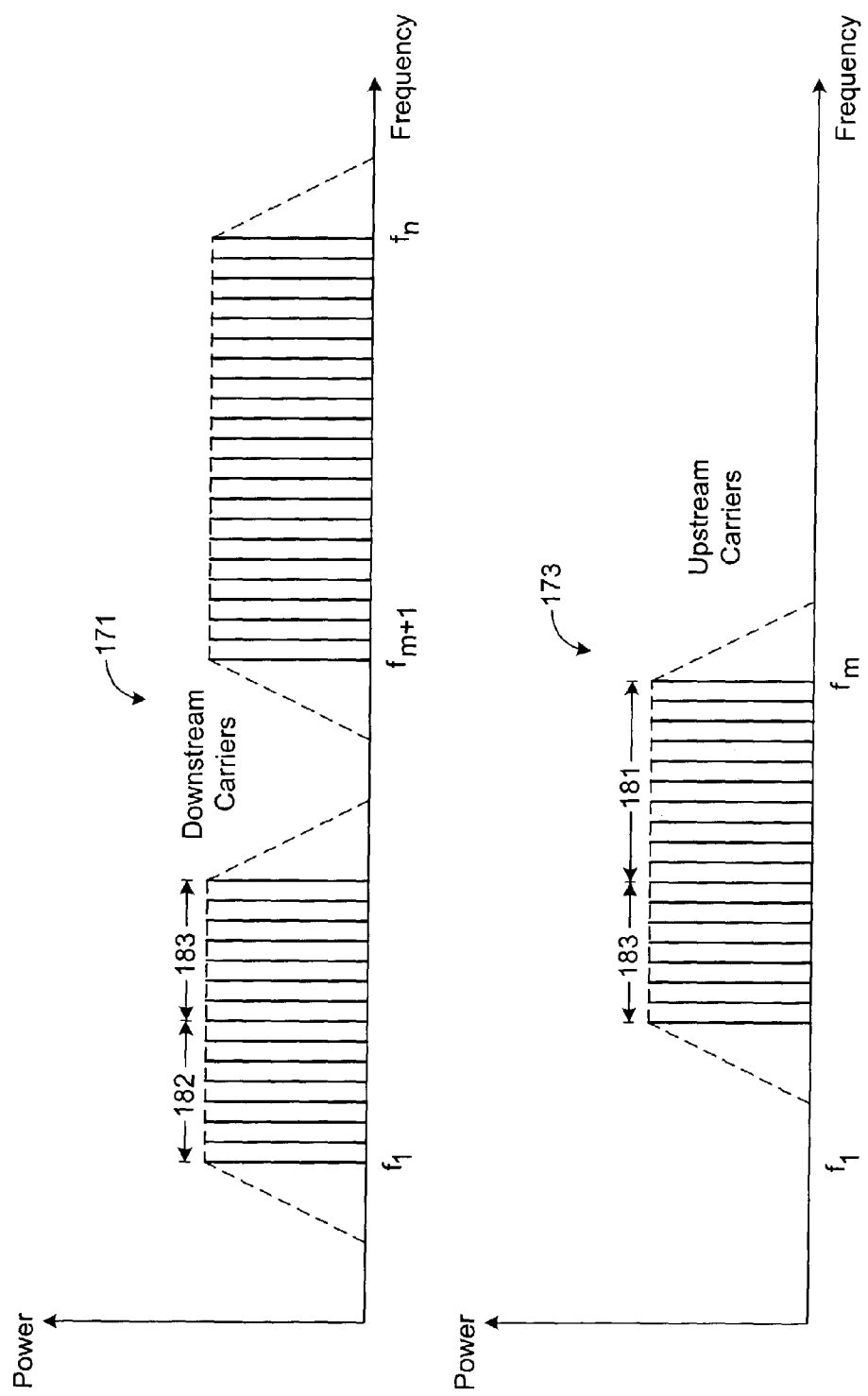
FIG. 4 illustrates the downstream and upstream frequency bands of FIG. 2 after upstream and downstream carriers have been removed by the system of FIG. 1 in accordance with an exemplary embodiment of the present invention.

As an example, when selecting overlapping downstream carriers for removal, the transceiver manager 122 preferably selects a band of contiguous downstream carriers in the upper portion of the overlapping band 178. Furthermore, when selecting upstream carriers for removal, the transceiver manager 112 preferably selects a band of contiguous upstream carriers in the lower portion of the overlapping band 178. As a result, the bands 171 and 173 may be modified to appear as shown in FIG. 4 for the data phase. Note that by removing upstream and downstream carriers from different portions of the overlapping band 178, the resulting overlapping band 183 shown by FIG. 4 can be reduced, and reducing the overlapping band 183 may be beneficial for enhancing the data rates achieved by the system 100.

Note that there are a variety of algorithms that may be employed to achieve the desired split described above. In the preferred embodiment, the foregoing split is generally achieved by removing overlapping upstream and downstream carriers from the overlapped frequencies in opposite directions. In this regard, when overlapping downstream carriers are to be removed, the transceiver manager 122 preferably selects for removal a first overlapping downstream carrier. Although other carriers can be selected, the transceiver manager 122 preferably selects for removal the highest frequency downstream carrier in the overlapping band 178 (i.e., the carrier having frequency $f_m$). After selecting this carrier, the transceiver manager 112 or 122 then selects for removal each downstream carrier of a successively lower frequency (i.e., $f_{m-1}, f_{m-2}, f_{m-3} \ldots$) until the desired capacity of the unselected carriers is reached.

In addition, when upstream carriers are to be removed, the transceiver manager 112 preferably selects for removal a first overlapping upstream carrier. Although other carriers can be selected, the transceiver manager 112 preferably selects for removal the lowest frequency upstream carrier in the overlapping band 178 (i.e., the carrier having frequency $f_1$). After selecting this carrier, the transceiver manager 112 then selects for removal each upstream carrier of a successively higher frequency (i.e., $f_2$, $f_3$, $f_4$ . . . ), thereby reducing upstream capacity and increasing downstream capacity, until the actual upstream capacity of the non-selected upstream carriers substantially matches the specified upstream capacity or until the total downstream capacity of all remaining downstream carriers substantially matches the specified downstream capacity. After selecting upstream carriers for removal, the transceiver 112 instructs the transceiver manager 122 of the TU-R 120 to remove the selected upstream carriers. In response, the transceiver manager 122 preferably refrains from transmitting the selected upstream carriers in the subsequent data phase of the communication session.

Figure 5:
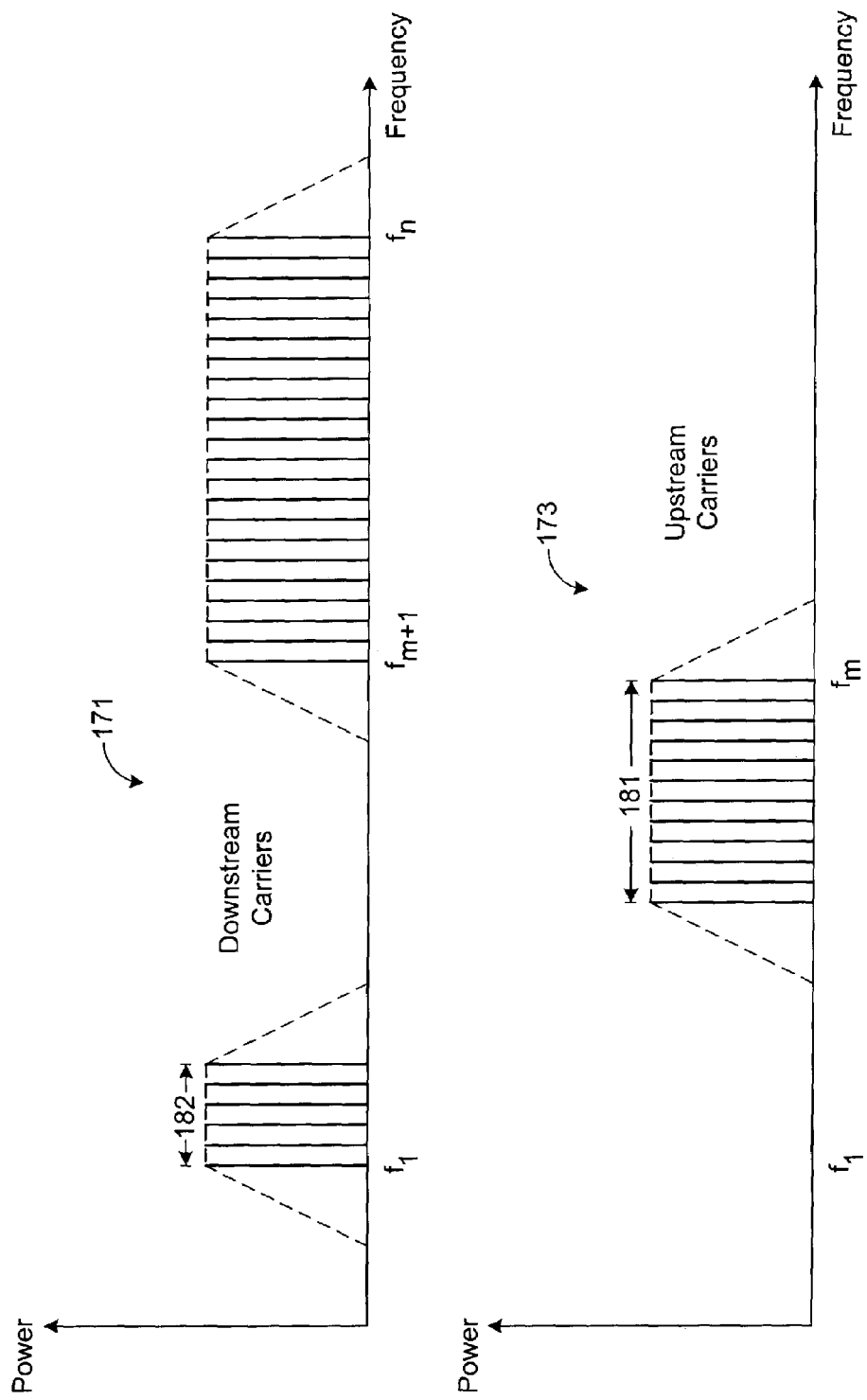
FIG. 5 illustrates the downstream and upstream frequency bands of FIG. 2 after a sufficient number of upstream and downstream carriers have been removed by the system of FIG. 1 such that an overlapping frequency band is split into two non-overlapping frequency bands.

By implementing the foregoing techniques, the overlapping band 178 is split into a contiguous band 181 of non-overlapping upstream carriers and/or a contiguous band 182 of non-overlapping downstream carriers. Depending on the number of overlapping upstream and downstream carriers removed, there may exist a small overlapping band 183 (as compared to the original overlapping band 178 of FIG. 2) between the two upstream and downstream bands 181 and 182, as shown by FIG. 4. Note that if a sufficiently large number of overlapping upstream and/or downstream carriers are removed, then the overlapping band 178 of FIG. 2 may be split into two separate upstream and downstream bands 181 and 182 with no overlapping bands, as shown by FIG. 5.

Moreover, by implementing the aforementioned techniques, the overlapping band 178 can be split into a contiguous band 181 of non-overlapping upstream carriers and a contiguous band 182 of non-overlapping downstream carriers, as described above. Splitting an overlapping band into one or more separate bands of upstream carriers and/or downstream carriers in this way has various advantages. Indeed, such splitting generally improves communication between the TU-C 110 and the TU-R 120 by facilitating filtering of the carriers. Furthermore, contiguously removing overlapping upstream and/or downstream carriers helps to improve the overall transmission efficiency of the system 100. However, it should be noted that upstream and/or downstream carriers can be removed according to other algorithms, if desired, without departing from the principles of the present invention. Indeed, although there are various benefits associated with the aforementioned algorithm, as described herein, it is not necessary for the removed upstream and/or downstream carriers to be contiguous.

In addition, as described above, both upstream and downstream carriers may be removed in some embodiments. In such embodiments, when the transceiver manager 112 has previously instructed the TU-R 120 to remove one or more overlapping upstream carriers and has received an instruction from the TU-R 120 to remove an overlapping downstream carrier, the transceiver manager 112 may be configured to instruct the transceiver manager 122 of the TU-R 120 to reinstate a previously removed overlapping upstream carrier in lieu of removing the downstream carrier. This has the effect of lowering the downstream capacity while at the same time enhancing the upstream transmission capacity. Furthermore, when the transceiver manager 122 has previously instructed the TU-C 110 to remove one or more overlapping downstream carriers and has received an instruction from the TU-R 120 to remove an overlapping upstream carrier, the transceiver manager 122 may be configured to instruct the transceiver manager 112 of the TU-C 110 to reinstate a previously removed overlapping downstream carrier in lieu of removing the upstream carrier. This has the effect of lowering the upstream capacity while at the same time enhancing the downstream transmission capacity.

By performing the aforedescribed carrier removal techniques, an efficient echo-cancelled transmission scheme for the data phase may be realized. However, in some instances, it may be more efficient to implement a split-band transmission scheme with an "adjusted split point," as will be described in more detail below, in lieu of the echo-cancelled transmission scheme that would otherwise be implemented according to the techniques described above. Such a split-band transmission scheme may be particularly advantageous when the echo-floor associated with connection 130 is significantly higher than the crosstalk noise floor associated with connection 130.

Figure 6:
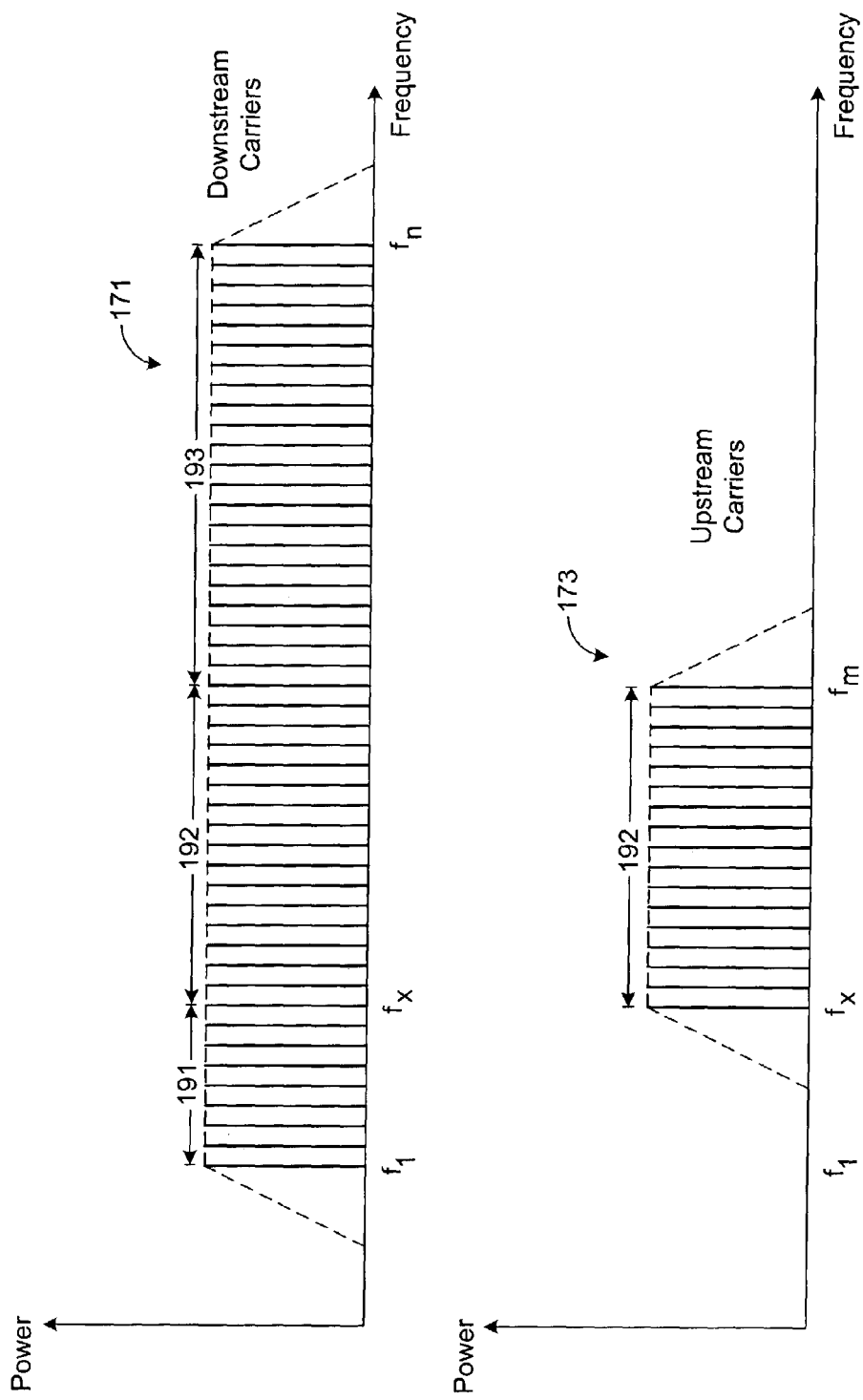
FIG. 6 illustrates the downstream and upstream frequency bands of FIG. 2 after upstream and downstream carriers have been removed by the system of FIG. 1 in accordance with an exemplary embodiment of the present invention.

Moreover, in the preferred embodiment, after performing the aforedescribed techniques to remove upstream and/or downstream carriers, one of the transceiver managers 112 or 122 preferably determines the total downstream transmission capacity of the TU-R 120. For example, assume that according to the aforedescribed techniques a band of overlapping upstream carriers are removed such that the resulting frequency bands 171 and 173 of the TU-C 110 and TU-R 120, respectively, for the data phase appear as shown in FIG. 6. In such an example, one of the transceiver managers 112 or 122 may determine the downstream transmission capacity of the TU-R 120 by summing the capacities of the downstream carriers within bands 191-193. Note that each of the summed capacities for bands 191 and 193 is preferably measured when the TU-R 120 is not transmitting an upstream carrier at the same frequency, and each of the summed capacities for band 192 is preferably measured when the TU-R 120 is simultaneously transmitting an upstream carrier of the same frequency. The total downstream transmission capacity determined by summing the capacities of the downstream carriers within bands 191-193 will be referred to hereafter as the "downstream EC data phase capacity."

Figure 7:
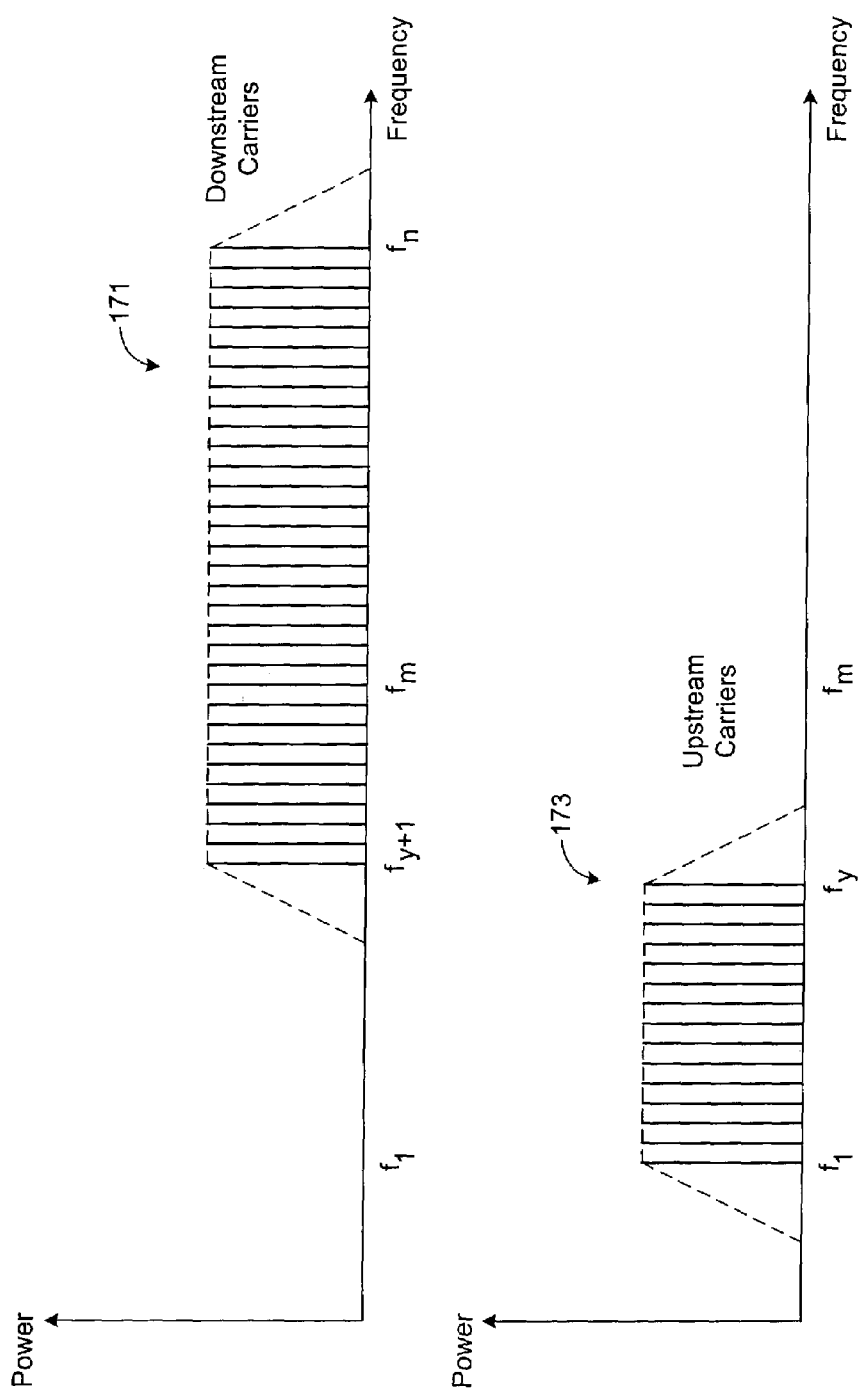
FIG. 7 illustrates exemplary downstream and upstream frequency bands determined by adjusting a split point of the frequency bands depicted in FIG. 3.

Furthermore, the transceiver managers 112 and 122 cause the TU-C 110 and the TU-R 120 to communicate during the training phase in a split-band mode at different split points. In this regard, a "split point" refers to a frequency point at which the split-band carriers transition from upstream to downstream or from downstream to upstream (in cases where the downstream carriers are at a lower frequency than the upstream carriers). For example, a split point for the frequency bands 171 and 173 shown in FIG. 3 is between $f_m$ and $f_{m+1}$. If the total upstream capacity of the TU-R 120 in the split-band mode (FIG. 3) is greater than the specified upstream capacity, then the transceiver managers 112 and 122 preferably adjust the frequency location of the split point such that the number of upstream carriers is reduced and the number of downstream carriers is increased. For example, the split point may be moved toward the lower frequency end of the bands 171 and 173 such that the split point occurs at a lower frequency, as shown by FIG. 7. In this regard, the split point may be moved between frequencies $f_y$ and $f_{y+1}$, as indicated by FIG. 7. Thus, the transceiver manager 112 causes the TU-C 110 to transmit downstream carriers from $f_{y+1}$ to $f_n$, and the transceiver manager 122 causes the TU-R 120 to transmit upstream carriers from $f_1$ to $f_y$.

After moving the split point, the transceiver 112 preferably determines the total upstream transmission capacity of the TU-R 120 while the TU-R 120 is transmitting in the split-band mode from $f_{y+1}$ to $f_n$. Note that moving the split point in this way has the effect of increasing the downstream capacity of TU-110 and decreasing the upstream capacity of TU-R 120. If the total upstream transmission capacity is still higher than the specified upstream capacity after the split point is moved, then the split point is further adjusted by moving the split point to a lower frequency location. Moreover, the split point is preferably moved in this manner until the total upstream transmission capacity of the TU-R 120 substantially matches the specified upstream transmission capacity. At this point, the downstream capacity of the TU-C 110 is generally at or close to a maximum without violating the specified upstream capacity.

After adjusting the split point such that the upstream transmission capacity substantially matches the specified upstream capacity, the transceiver manager 122 preferably determines the total downstream capacity of the TU-C 110. For example, assuming that the total capacity of the upstream frequency band 173 of FIG. 7 substantially matches the specified upstream capacity, then the transceiver manager 122 may determine the total downstream capacity, referred to hereafter as the "downstream SB data phase capacity," by summing the capacities of the downstream carriers from $f_{y+1}$ to $f_n$.

If the downstream SB data phase capacity exceeds the downstream EC data phase capacity, then the transceiver managers 112 and 122 preferably implement the aforedescribed split-band transmission scheme rather than the echo-cancelled transmission scheme. Thus, in the example described above, the transceiver managers 112 and 122 preferably communicate during the data phase according to the frequency bands 171 and 173 shown by FIG. 7 rather than the frequency bands 171 and 173 shown by FIG. 6, if the downstream SB data phase capacity exceeds the downstream EC data phase capacity. However, if the downstream EC data phase capacity exceeds the downstream SB data phase capacity, then the transceiver managers 112 and 122 preferably implement the echo-cancelled transmission scheme rather than the split-band transmission scheme. In the example described above, the transceiver managers 112 and 122 preferably communicate according to the frequency bands 171 and 173 shown by FIG. 6 rather than the frequency bands 171 and 173 shown by FIG. 7, if the downstream EC data phase capacity exceeds the downstream SB data phase capacity.

Figure 8:
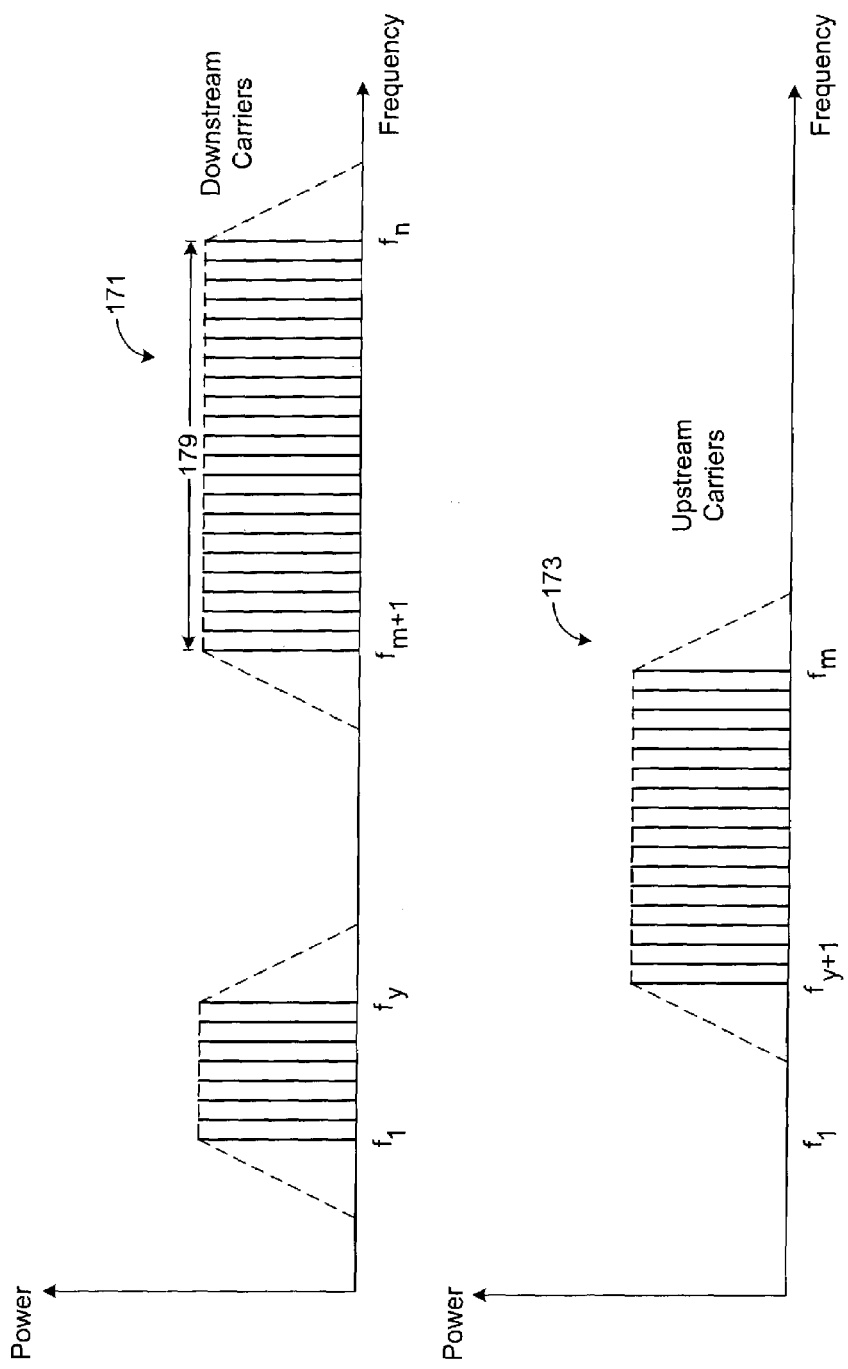
FIG. 8 illustrates exemplary downstream and upstream frequency bands determined by creating and adjusting a new split point within the frequency bands depicted in FIG. 3.

It should be noted that it is possible for there to be more than one split points in the split-band mode. For example, rather than adjusting the split point shown by FIG. 3, it is possible to create a new split point by removing upstream carriers and adding downstream carriers at the low end of the bands 171 and 173, as shown by FIG. 8. This new split point may be moved in a higher frequency direction in order to increase downstream capacity and decrease upstream capacity.

Furthermore, adjusting split points, as described above, yields efficient split-band transmission schemes by creating contiguous bands of upstream and downstream carriers. However, it is possible to create split-bands via other algorithms. For example, it is possible to select a frequency of an upstream carrier via an algorithm not specifically described herein. Then, the upstream carrier at the selected frequency may be removed, and a downstream carrier at the selected frequency may be added. Such a technique generally achieves the effect of increasing downstream capacity and decreasing upstream capacity and, therefore, may be employed to achieve the results described herein. However, different algorithms for selecting carriers may not be as efficient as the algorithm implemented in the preferred embodiment, as described herein.

Note that the split point may be adjusted such that upstream capacity is increased and downstream capacity is decreased. Adjusting the split point in such a manner may be desirable when the measured upstream split-band capacity of the TU-R 120 is less than the specified upstream capacity. However, the upstream band may be limited by applicable standards, and in some instances, adjusting the split point in such a manner may violate an applicable standard.

To better illustrate the principles of the present invention, the operation of the system 100 will now be described according to current standards, such as the spectrum management standard, T1.417, as it applies to ADSL communication. Note that in other embodiments, the system 100 may communicate according to types of communication other than ADSL and according to other types of standards, if desired.

Figure 9:
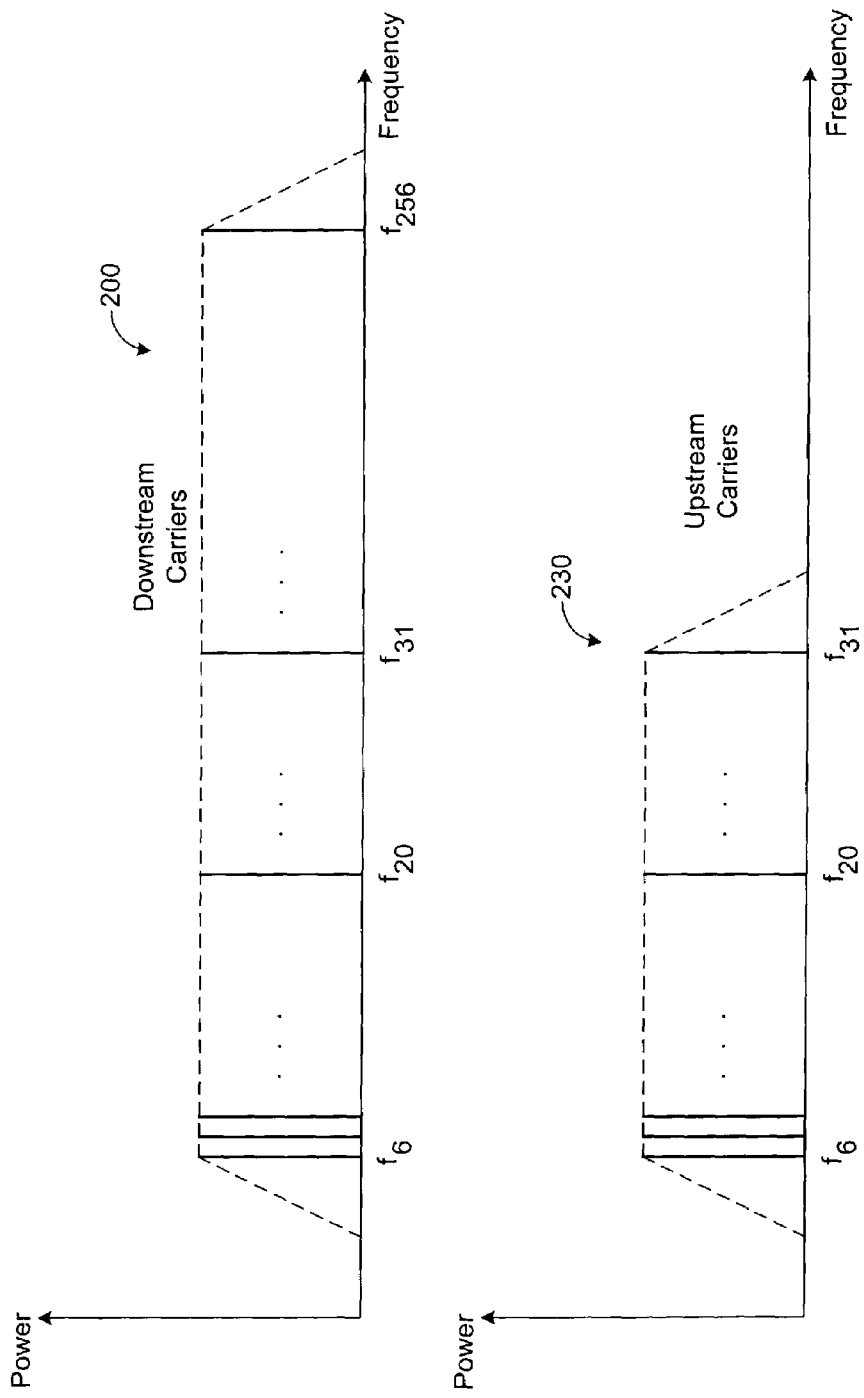
FIG. 9 illustrates exemplary downstream and upstream frequency bands for data communication for the communication system of FIG. 1 when the system is configured to enable full echo canceled ADSL communication.

Current T1.417 standards provide a PSD template, which allows for echo canceled operation of ADSL as shown in FIG. 9. The template allows downstream transmission at a nominal −40 dBm/Hz from approximately 25.8 kHz to approximately 1.104 MHz, and the template allows upstream transmission at a nominal −38 dBm/Hz from approximately 25.8 kHz to approximately 138 kHz. Note that the frequencies in the respective bands are labeled $f_6$, $f_7$, ... $f_{256}$ for the downstream carriers 200 and $f_6$, $f_7$, ... $f_{31}$ for the upstream carriers 230.

Note that, in other embodiments, different frequency ranges for the upstream and downstream carriers are possible. For example, it is possible for the upstream and/or downstream carriers to be communicated at frequencies below $f_6$ (i.e., 25.8 kHz). Further, it is possible for downstream carriers to be communicated at frequencies higher than $f_{256}$ (i.e., 1.104 MHz), and it is possible for upstream carriers to be communicated at frequencies higher than $f_{31}$ (i.e., 138 kHz).

Furthermore, as shown by FIG. 9, the bands 200 and 230 overlap between frequencies $f_6$ and $f_{31}$. When there are overlapping frequencies of upstream and downstream carriers, as in the case shown by FIG. 9, echoes from the transmission of downstream carriers may interfere with received upstream carriers and vice versa. Thus, in these cases, echo cancellers are generally employed to reduce distortions caused by such echoes. Moreover, when the TU-C 110 and TU-R 120 are operating according to the template shown by FIG. 9, the TU-C 110 and TU-R 120 preferably employ echo cancellers to reduce echo distortions within the overlapping frequencies $f_6$ through $f_{31}$, and the TU-C 110 and TU-R 120 are said to be operating in an "echo-cancelled (EC) mode."

When a determination is made, according to the techniques described herein, that one or more overlapping downstream carriers are to be removed, overlapping downstream carrier $f_{31}$ and each downstream carrier of a successively lower frequency ($f_{30}$, $f_{29}$, $f_{28}$ ...) may be removed until the desired data rate is achieved. For example, if the specified upstream capacity is greater than a total upstream capacity of the TU-R 120 for the echo-cancelled mode, then downstream overlapping carriers of frequencies $f_{31}$, $f_{30}$, $f_{29}$ ... may be removed, thereby decreasing downstream capacity and increasing upstream capacity, until the total upstream capacity of the TU-R 120 substantially matches the specified upstream capacity. Note that it is possible in other embodiments to remove different ones of the overlapping downstream carriers and/or to remove overlapping downstream carriers via a different algorithm, if desired. However, for at least the reasons previously set forth, it is generally desirable for the removed downstream carriers to be contiguous, if possible.

In addition, when a determination is made, according to the techniques described herein, that one or more overlapping upstream carriers are to be removed, overlapping upstream carrier $f_6$ and each upstream carrier of a successively higher frequency ($f_7$, $f_8$, $f_9$ . . . ) may be removed until the desired data rate is achieved. For example, if the specified upstream capacity is less than a total upstream capacity of the TU-R 120 for the echo-cancelled mode, then upstream overlapping carriers $f_6$, $f_7$, $f_8$ . . . may be removed, thereby increasing downstream capacity and decreasing upstream capacity, until the total capacity of the non-removed upstream carriers substantially matches the specified upstream capacity. Note that it is possible in other embodiments to remove different ones of the overlapping upstream carriers and/or to remove overlapping upstream carriers via a different algorithm, if desired. However, for at least the reasons previously set forth, it is generally desirable for the removed upstream carriers to be contiguous, if possible, and it is generally desirable for the removed upstream carriers to have frequencies different than any removed downstream carriers, if possible.

Figure 10:
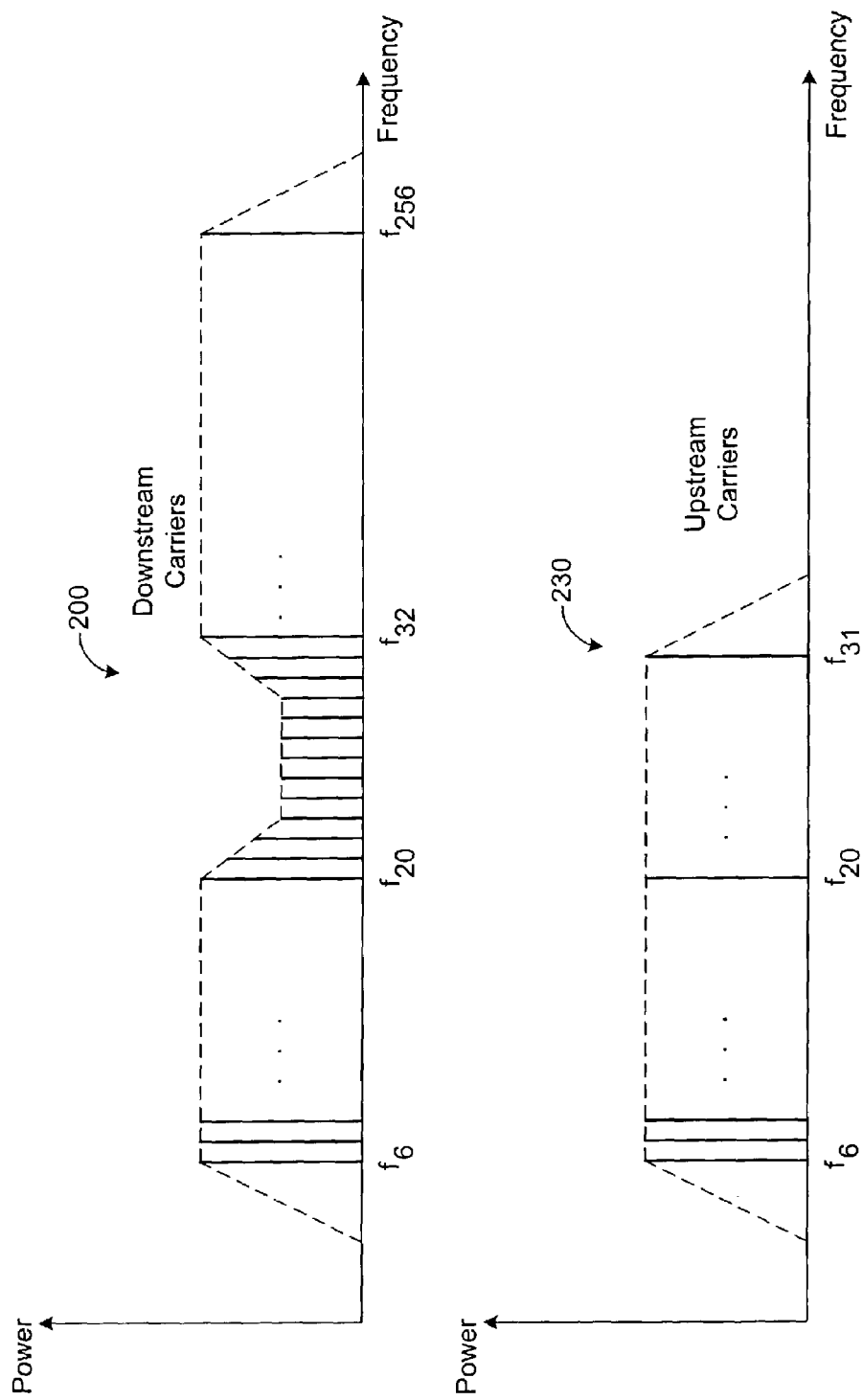
FIG. 10 illustrates downstream and upstream frequency bands for ADSL communication in accordance with spectrum management class 5 PSD for communication connections above approximately 13.5 kilo-feet.

It should be noted that current T1.417 standards specify a different PSD template for echo canceled ADSL for communication connections exceeding 13.5 kilo-feet (kft). For such connections, the T1.417 standards provide a PSD template for unrestricted operation of ADSL as shown in FIG. 10. The template allows downstream transmission at a nominal −40 dBm/Hz in a low-band from approximately 25.8 kHz to approximately 81 kHz with a roll off to −53 dBm/Hz between approximately 92.1 and 121.4 kHz. The PSD then ramps back up to −40 dBm/Hz in a high-band at approximately 138 kHz where it remains out to approximately 1.104 MHz. The template also allows upstream transmission at a nominal −38 dBm/Hz from approximately 25.8 kHz to approximately 138 kHz.

Figure 11:
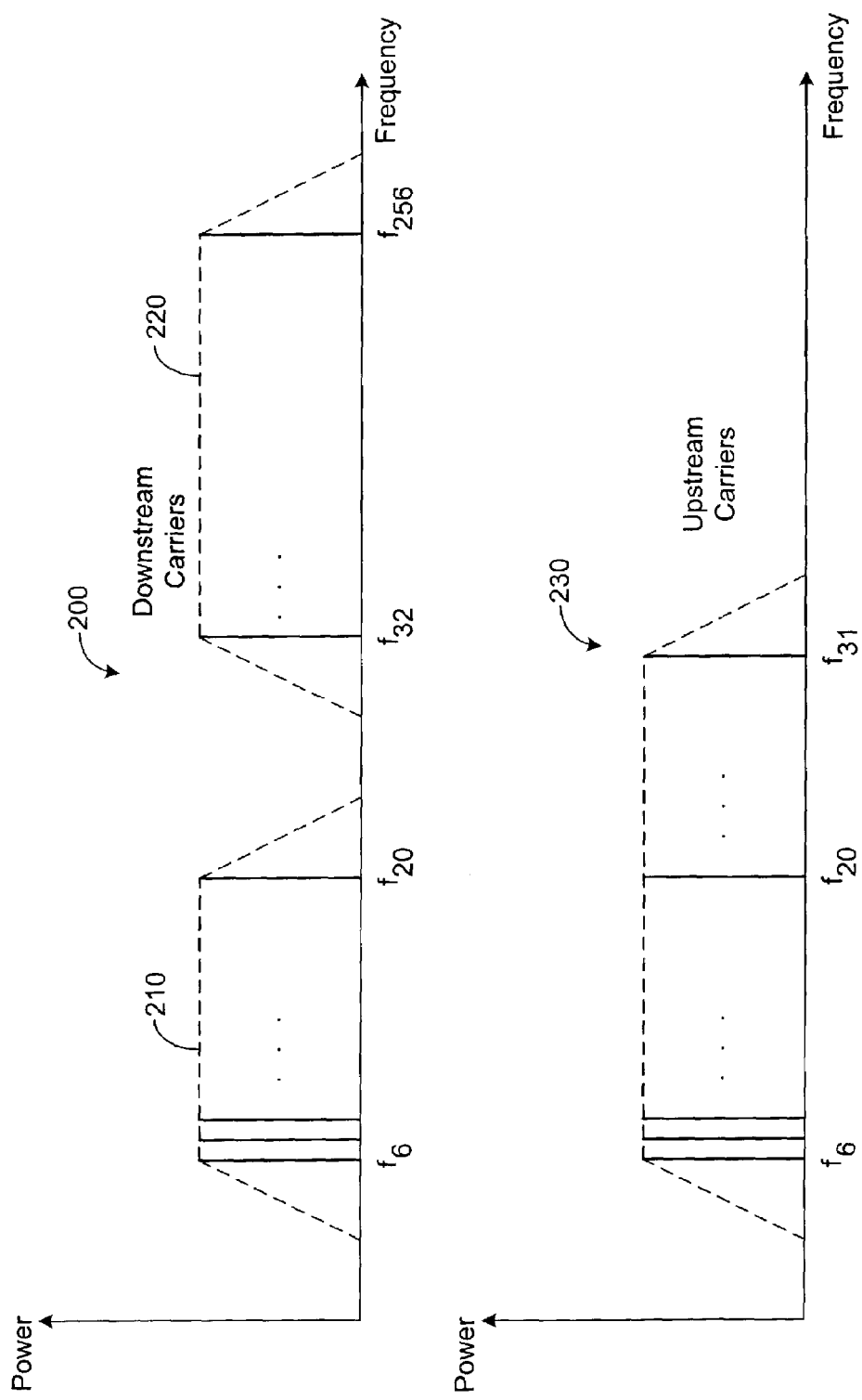
FIG. 11 illustrates exemplary downstream and upstream frequency bands for ADSL communication by the communication system of FIG. 1 for communication connections in excess of approximately 13.5 kilo-feet.

Note that, as shown by FIG. 10, the bands 200 and 230 generally overlap between frequencies $f_6$ and $f_{31}$. However, the carriers having frequencies between $f_{21}$ and $f_{31}$ are at reduced power levels. In an attempt to optimize performance, the transceiver manager 112 of the TU-C 110 is preferably configured to remove these lower power overlapping carriers $f_{21}$ through $f_{31}$ such that the TU-C 110 is initially configured, before implementation of the carrier removal techniques described herein, to communicate a low-band 210 and a high-band 220 of downstream carriers, as shown by FIG. 11.

Thus, in embodiments where the communication connection 130 between the CTU 110 and RTU 120 exceeds approximately 13.5 kft, overlapping downstream carrier $f_{20}$ and each downstream carrier of a successively lower frequency ($f_{19}$, $f_{18}$, $f_{17}$ . . . ) may be removed until the desired data rate is achieved. For example, if the specified upstream capacity is greater than a total upstream capacity of the TU-R 120 for the echo-cancelled mode, then downstream overlapping carriers of frequencies $f_{20}$, $f_{19}$, $f_{18}$ . . . may be removed, thereby decreasing downstream capacity and increasing upstream capacity, until the total upstream capacity of the TU-R 120 substantially matches the specified upstream capacity. Note that it is possible in other embodiments to select different ones of the overlapping downstream carriers for removal and/or to remove overlapping downstream carriers via a different algorithm, if desired. However, for the reasons previously set forth, it is generally desirable for the removed downstream carriers to be contiguous if possible.

In addition, it should be noted that the upstream band 230 begins at the same frequency (i.e., $f_6$) regardless of whether the communication connection 130 between the transceiver units 110 and 120 is above or below 13.5 kft. Thus, the upstream carriers may be removed in the same manner described above for connections below 13.5 kft even if the communication connection 130 between the TU-C 110 and TU-R 120 exceeds 13.5 kft.

Figure 12:
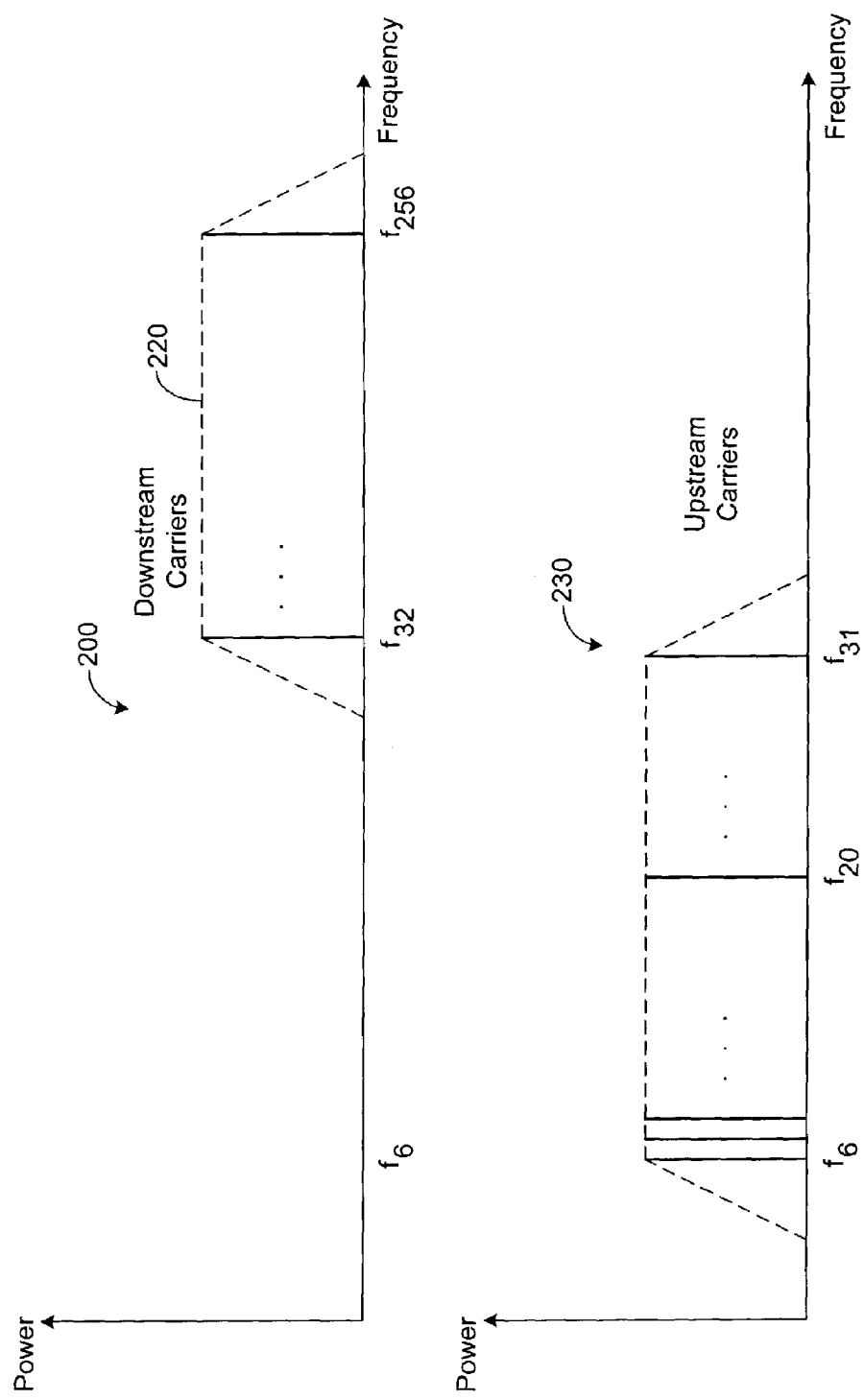
FIG. 12 illustrates exemplary downstream and upstream frequency bands for ADSL communication by the communication system of FIG. 1 while operating in a split-band (FDD) mode.

It should be further noted that, if desired, all of the low-band downstream carriers 210 may be removed by the transceiver manager 112 such that there are no overlapping frequencies between the upstream and downstream carriers. Such an embodiment is depicted in FIG. 12. When the transceiver units 110 and 120 are operating in such a manner, the transceiver units 110 and 120 are said to be operating in a "frequency division duplex (FDD) mode" or "split-band (SB) mode." Operating in the SB mode generally maximizes the upstream capacity of the TU-C 110. In this regard, interference experienced by an upstream carrier is generally lower when there is no downstream carrier having the same frequency. Thus, operating in the SB mode helps to increase the upstream capacity of the TU-R 120. In fact, as described above, the system 100 may be configured to operate in the SB mode when the transmission capacity of the TU-R 120 is below the specified upstream capacity.

An exemplary operation of the system 100 in accordance with the preferred embodiment will now be described in detail. For illustrative purposes, assume that the transceiver units 110 and 120 are configured to communicate according to ADSL communication techniques and that the distance between the transceiver units 110 and 120 is greater than 13.5 kft such that the templates shown by FIG. 11 (for the EC mode) or FIG. 12 (for the SB mode) are generally applicable. Note that other types of communication techniques and other types of distances are possible in other embodiments.

Initially, a maximum downstream capacity and a required (minimum) upstream capacity are specified. Values indicative of the specified upstream and downstream capacities may be stored in the transceiver units 110 and 120 and utilized by the transceiver units 110 and 120, according to techniques described herein, to ensure that the upstream and downstream capacities do not violate the specified capacities.

Note that, for ADSL, the specified or maximum downstream capacity is generally greater than the specified or required upstream capacity. In the preferred embodiment, the maximum downstream capacity is referred to as $C_{DM}$ and the specified or required upstream capacity is referred to as $C_{UR}$. After a service provider enables communication between the transceiver units 110 and 120 over the connection 130 and specifies upstream and downstream capacities, the transceiver units 110 and 120 establish a communication session between each other and then communicate to one another during a training phase of the communication session in order to determine the upstream and downstream capacities of the transceiver units 110 and 120. Techniques for making such determinations are well known in the art. Indeed, it is well known by those skilled in the art that measurements of signals and noise and determination of signal quality may be made within a transceiver unit using signal processing methods, such as fast Fourier transforms (FFTS) and conventional mathematical operations. These processing methods may be employed by transceiver units 110 and 120 of the communication system 100 in determining the upstream and downstream capacities of the transceiver units 110 and 120.

The following table of definitions is provided to assist in the understanding of the present invention:

| Variable | Definition |
| --- | --- |
| $C_U$ | upstream capacity |
| $C_{UR}$ | upstream required capacity (a minimum) |
| $C_{US}$ | upstream capacity for split-band mode |
| $C_{UE}$ | upstream capacity for echo-cancelled mode |
| $C_D$ | downstream capacity |
| $C_{DM}$ | maximum downstream capacity |
| $C_{DS}$ | downstream capacity for split-band mode |
| $C_{DE}$ | downstream capacity for echo-cancelled mode |
| Lower case C's are for vector values | For example $c_{UE}(j)$ |

Figure 13:
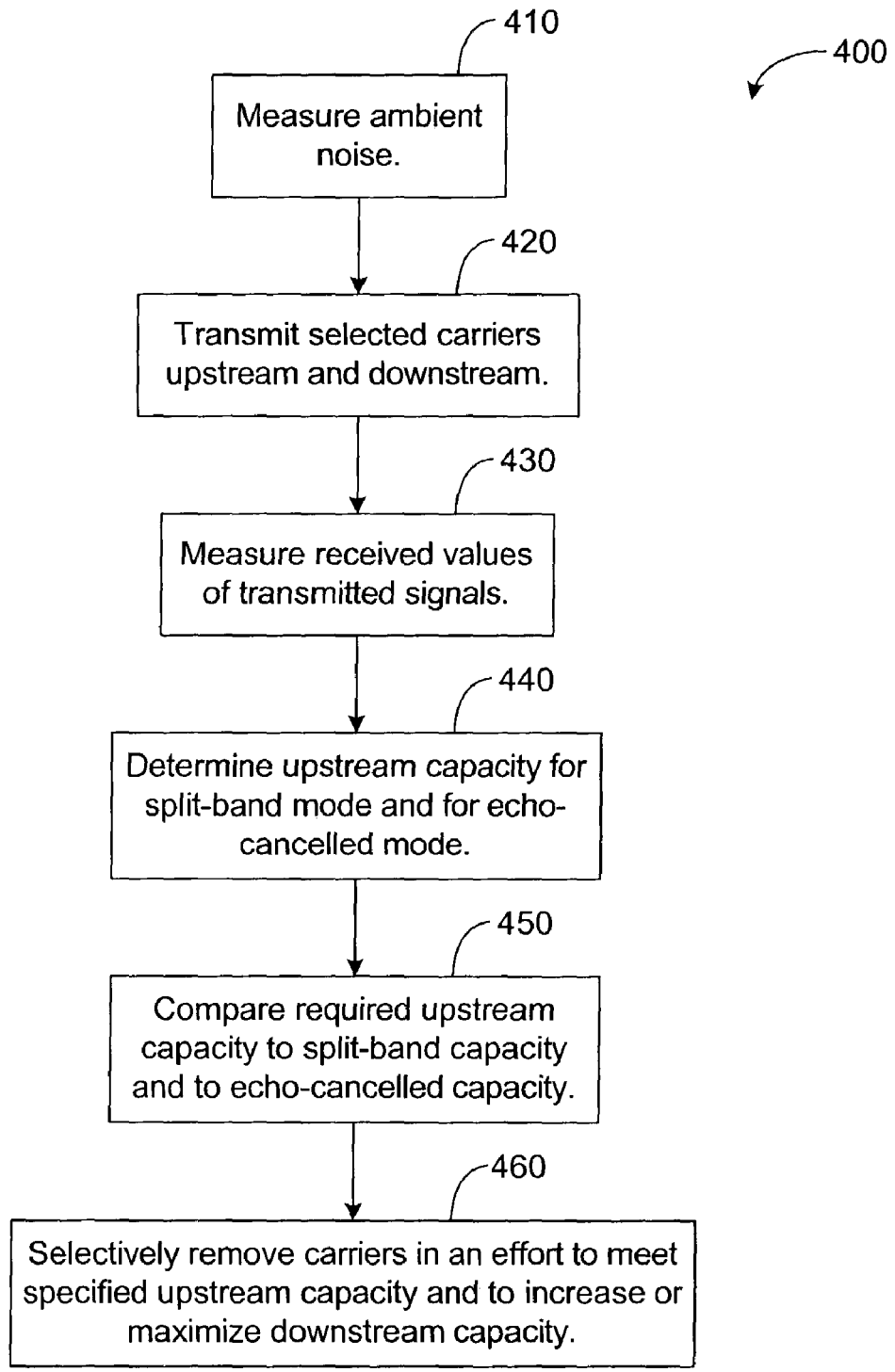
FIG. 13 is a flow chart illustrating a method for measuring and adjusting transmission capacities in accordance with a preferred embodiment of the present invention.

During the training phase, each of the transceiver managers 112 and 122 measures the ambient noise in its respective receiver 118 and 128 in step 410 of FIG. 13. The noise measurement is preferably limited to the frequency bands of interest. For example, since the upstream carriers contain the frequencies from $f_6$ to $f_{31}$, the transceiver manager 112 of the TU-C 110 preferably does not measure noise outside of upstream band 230. Furthermore, the transceiver manager 122 of the TU-R 120 preferably measures noise in the frequency bands 210 and 220 only.

The noise measurements are stored in memory of the respective transceiver unit. Via step 420, the transmitters 115 and 125 in the transceiver units 110 and 120 transmit selected frequencies. In the preferred embodiment, the transmitter 115 in the TU-C 110 transmits carriers $f_6$ through $f_{20}$ and $f_{32}$ through $f_{256}$, and the transmitter 125 in the TU-R 120 transmits carriers $f_6$ through $f_{31}$ in three phases (PHASE 1, PHASE 2, and PHASE 3), which may occur in any order. In PHASE 1, TU-R 120 transmits carriers $f_6$ through $f_{31}$ only, and in PHASE 2, the TU-C 110 transmits carriers $f_{32}$ through $f_{256}$ only. In step 430, each of the carriers transmitted in PHASES 1 and 2 are measured, and the capacity of each such carrier is determined based on the carrier's signal-to-noise ratio. The capacities determined from PHASES 1 and 2 will later be used, in step 440, to determine the total upstream and downstream capacities for the split-band (SB) mode and will be referred to hereafter as "split-band capacity vectors."

In PHASE 3, the TU-C 110 and TU-R 120 transmit carriers simultaneously. More particularly, the TU-C 110 transmits carriers $f_6$ through $f_{20}$ and $f_{32}$ through $f_{256}$, and the TU-R 120 transmits carriers $f_6$ through $f_{31}$. In step 430, each of the carriers transmitted in PHASE 3 are measured, and the capacity of each such carrier is determined based on the carrier's signal-to-noise ratio. The capacities determined from PHASE 3 will later be used, in step 440, to determine the total upstream and downstream capacities for the echo-cancelled (EC) mode and will be referred to as "echo-cancelled capacity vectors."

Note that the capacity vectors determined from the carriers transmitted in PHASES 1-3 may be expressed as capacity vectors $c_{US}(j)$, $c_{DS}(j)$, $c_{UE}(j)$, and $c_{DE}(j)$ where j is the index associated with each tone, $f_j$, and where $c_{US}(j)$ refers to upstream echo-cancelled capacity vectors, $c_{DS}(j)$ refers to downstream split-band capacity vectors, $c_{UE}(j)$ refers to upstream echo-cancelled capacity vectors, and $c_{DE}(j)$ refers to downstream echo-cancelled capacity vectors. By summing the vectors over index values, j, the total upstream and downstream capacities may be determined. For example, if the transceiver units 110 and 120 are operating in the split-band mode using the frequencies as shown in FIG. 12, then the upstream capacity and downstream capacity may be expressed as:

$$C_{US} = \Sigma c_{US}(j) \text{ for } j=6, 7, 8 \ldots, 31, \text{ and}$$

$$C_{DS} = \Sigma c_{DS}(j) \text{ for } j=32, 33, 34 \ldots, 256.$$

Referring to FIG. 11, the upstream capacity and downstream capacity in the EC mode may be expressed as:

$$C_{UE} = \Sigma c_{UE}(j) \text{ for } j=6, 7, 8 \ldots, 31, \text{ and}$$

$$C_{DE} = \Sigma c_{DE}(j) \text{ for } j=6, 7, 8 \ldots, 19; 32, \ldots, 256.$$

In step 450, the required upstream capacity, $C_{UR}$, is preferably compared to $C_{US}$ and $C_{UE}$ by the transceiver manager 112. The results of the comparison may be used to adaptively remove carriers from the upstream carriers and/or the downstream carriers in accordance with an adaptive algorithm, step 460. The carriers that remain after the removal of carriers may then be used to transport data during the subsequent data phase, which occurs after the training of the TU-C 110 and TU-R 120.

The carrier removal algorithm is preferably based on relations between the specified or required upstream capacity, a measured echo-cancelled upstream capacity, and a measured split-band upstream capacity. The relationship between capacities and the corresponding actions is generally shown in an algorithm table 500 of FIG. 14. CASE 1 refers to the condition when the measured split-band upstream capacity, $C_{US}$, is less than the required upstream capacity, $C_{UR}$. For such a condition, it is generally not possible to meet the required upstream capacity, $C_{UR}$, assuming that all available upstream channels (as defined by the applicable standard) are utilized for the split-band mode. Therefore, the highest available upstream capacity, $C_{US}$, is preferably selected, and all upstream carriers 230 are preferably used for upstream data communication. Further, in CASE 1, all the overlapping downstream carriers $f_6$ through $f_{31}$ are preferably removed in an effort to maximize the upstream capacity. In other words, the system 100 operates in the SB mode.

Figure 15:
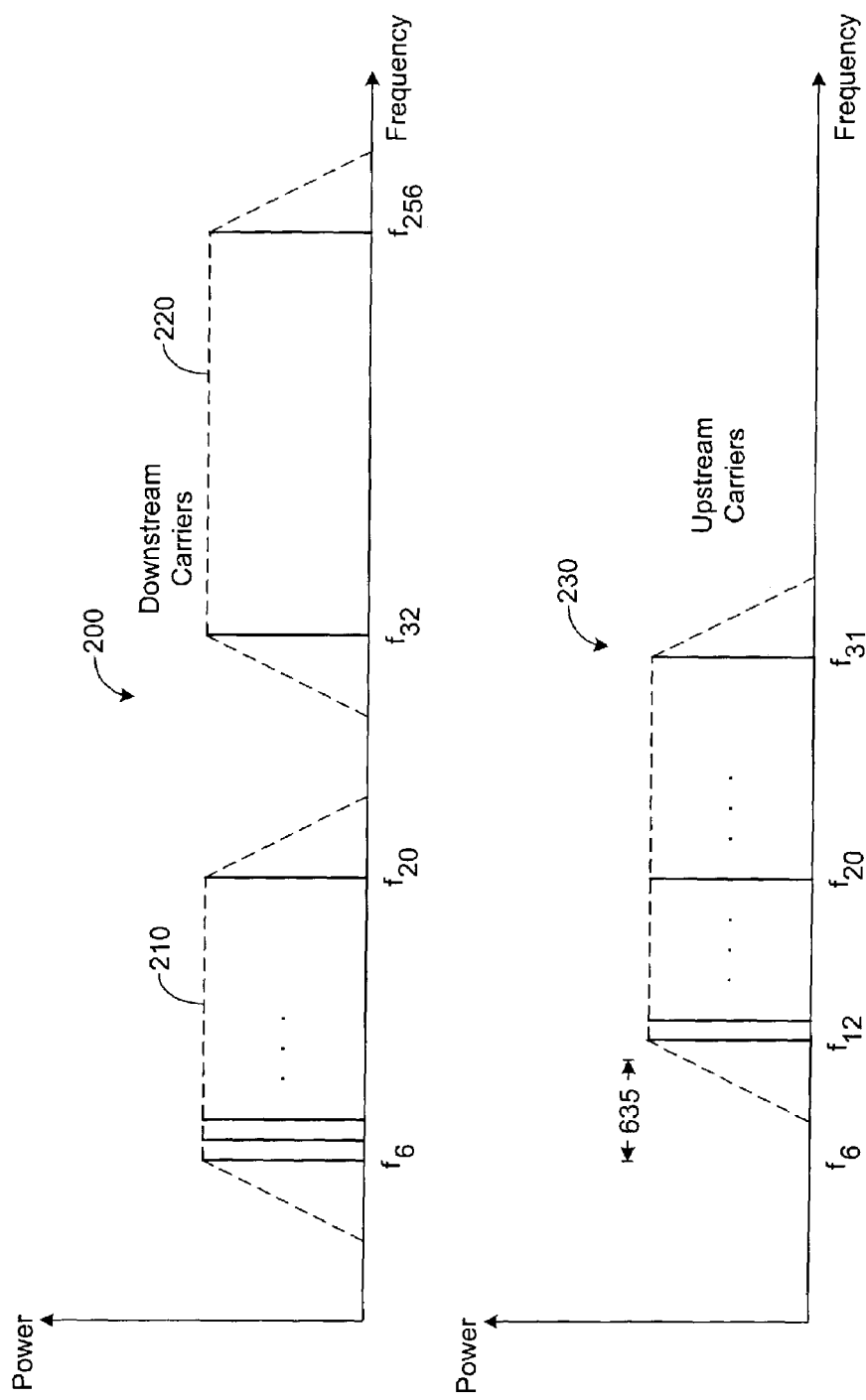
FIG. 15 illustrates the downstream and upstream frequency bands of FIG. 11 after the communication system of FIG. 1 has removed upstream carriers in accordance with a preferred embodiment of the present invention.

If the required upstream capacity, $C_{UR}$, is less than the upstream echo cancelled capacity, $C_{UE}$, CASE 2, then carriers are selectively removed from the overlapping upstream carriers 230 until the upstream capacity substantially matches the required upstream capacity, $C_{UR}$. The removal process for CASE 2 is illustrated in FIG. 15, which shows that upstream carriers $f_6$ through $f_{11}$ within the band 635 have been removed. The upstream capacity, when the carriers are removed, may be expressed as:

$$C_U = \Sigma c_{UE}(k) \text{ where } k \text{ is the index for the remaining carriers}$$

or alternately as:

$$C_U = C_{UE} - \Sigma c_{UE}(j) \text{ where } j \text{ is the index for the removed tones.}$$

Thus, in the previous example, where upstream carrier $f_6$ through $f_{11}$ are removed, the upstream capacity may be expressed as:

$$C_U = \Sigma c_{UE}(k) \text{ for } k=12, 13, 14, \ldots 31.$$

Figure 16:
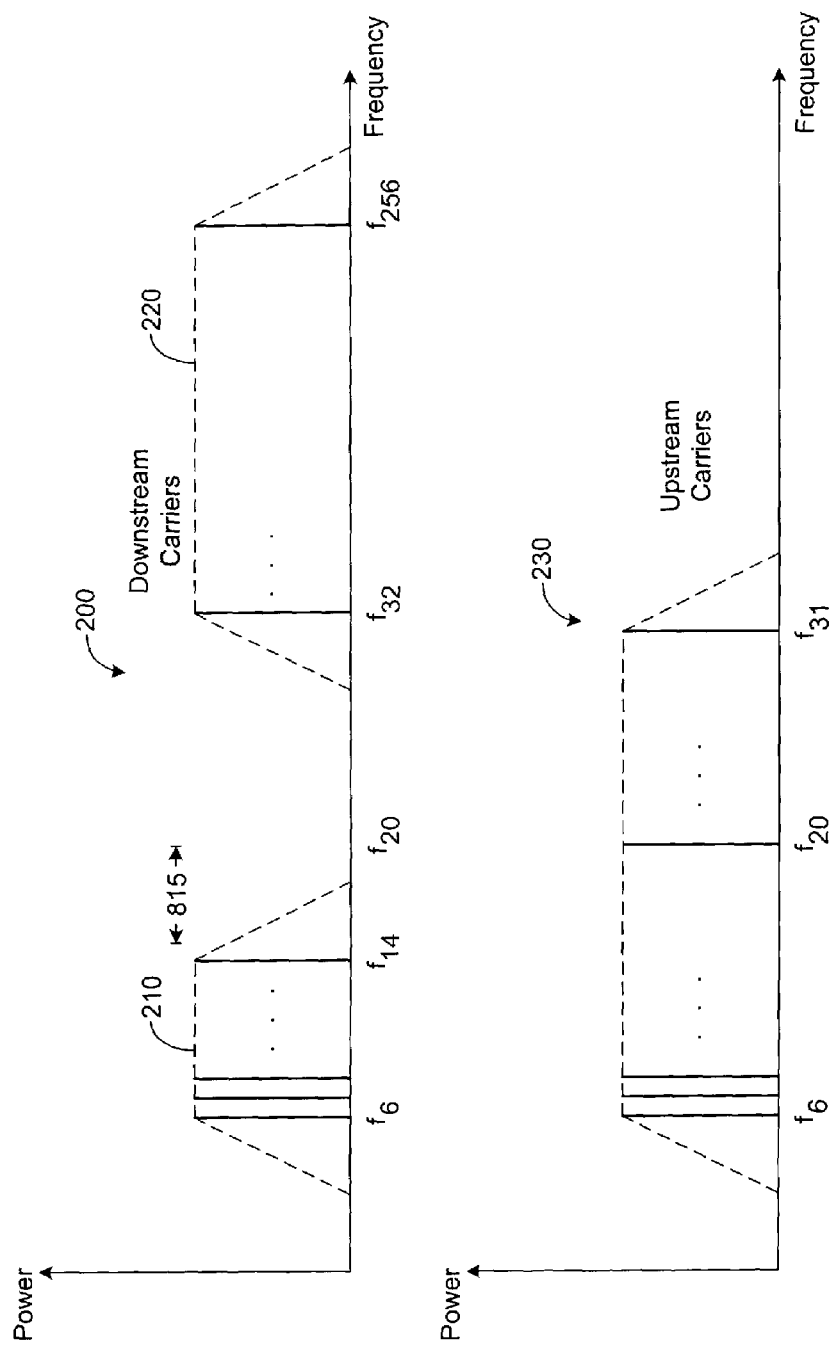
FIG. 16 illustrates the downstream and upstream frequency bands of FIG. 11 after the communication system of FIG. 1 has removed downstream carriers in accordance with a preferred embodiment of the present invention.

If the required upstream capacity, $C_{UR}$, is greater than the upstream echo cancelled capacity, $C_{UE}$, and less than the upstream split-band capacity, $C_{US}$, CASE 3, then carriers are preferably removed from the plurality of overlapping downstream carriers as shown in FIG. 16. In the preferred embodiment, overlapping downstream carriers 815 are removed, as shown in FIG. 16, from the low-band downstream carriers 210. The removal of the downstream carriers 815 provides for more upstream capacity for the corresponding upstream carriers since there is a reduction in echo for corresponding carriers. For example, when downstream carrier $f_{20}$ is removed, the split-band capacity vector replaces the echo-cancelled capacity vector and since, for most cases, $c_{US}(20) > c_{UE}(20)$ there is an increase in upstream capacity. The new capacity may be expressed as:

$C_U = \Sigma c_{US}(j) + \Sigma c_{UE}(k)$ where $j$ is the index for the split-band vectors and $k$ is the index for the echo cancelled vectors.

Note that, in the foregoing equation, "split-band vectors" refer to any vector associated with an upstream carrier having a frequency that does not overlap with a frequency of any remaining downstream carrier, and "echo cancelled vectors" refer to any vector associated with an upstream carrier having a frequency that overlaps with a frequency of any remaining downstream carrier. For example, the vectors associated with upstream carriers $f_6$ through $f_{20}$ are preferably echo cancelled vectors unless a corresponding downstream carrier has been removed. In this regard, assume that downstream carrier $f_{20}$ is removed. In such an example, none of the remaining downstream carriers has the same frequency as the upstream carrier $f_{20}$. Thus, the vector associated with upstream carrier $f_{20}$ is a split-band carrier.

Thus, in the previous example where downstream carriers $f_{15}$ through $f_{20}$ are removed, the upstream capacity may be expressed as:

$C_U = \Sigma c_{US}(j) + \Sigma c_{UE}(k)$ for $j=32, 33, 34, \ldots 256$ and $k=6, 7, 8, \ldots 14$.

Upon completion of the removal algorithm as illustrated in FIG. 13 and FIG. 14, the total downstream capacity may be determined to ensure that it does not exceed the specified downstream capacity. The total downstream capacity ($C_D$) may be determined from the following equation:

$C_D = \Sigma c_{DS}(j) + \Sigma c_{DE}(k)$ where $j$ is the index for the remaining split-band vectors and $k$ is the index for the remaining echo cancelled vectors.

Note that, in the foregoing equation, "remaining split-band vectors" refer to any vector associated with a remaining downstream carrier having a frequency that does not overlap with a frequency of any remaining upstream carrier, and "remaining echo cancelled vectors" refer to any vector associated with a remaining downstream carrier having a frequency that overlaps with a frequency of any remaining upstream carrier. For example, the vectors associated with any remaining downstream carriers $f_{32}$ through $f_{256}$ are preferably split-band vectors since there is no upstream carrier having the same frequency. Furthermore, the vectors associated with any remaining downstream carriers $f_6$ through $f_{20}$ are preferably echo cancelled vectors unless a corresponding upstream carrier has been removed. For example, assume that downstream carrier $f_{20}$ is remaining and that upstream carrier $f_{20}$ has been previously removed. In such an example, none of the remaining upstream carriers has the same frequency as the downstream carrier $f_{20}$. Thus, the vector associated with downstream carrier $f_{20}$ is a remaining split-band carrier.

Figure 17:
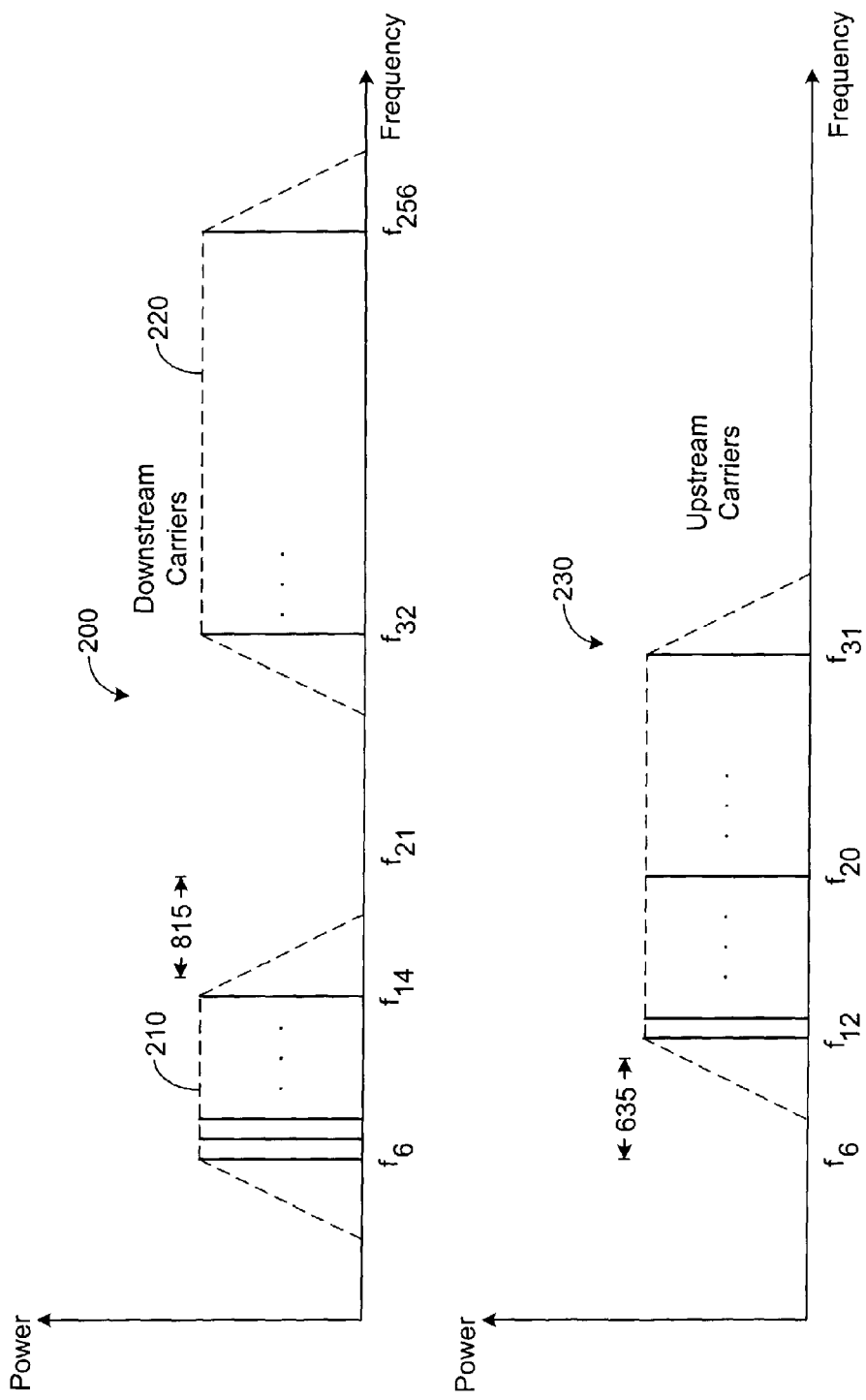
FIG. 17 illustrates the downstream and upstream frequency bands of FIG. 11 after the communication system of FIG. 1 has removed both downstream and upstream carriers in accordance with a preferred embodiment of the present invention.

If $C_D$ exceeds the specified downstream capacity, then overlapping downstream carriers are preferably removed until the total downstream capacity substantially matches the specified downstream capacity. FIG. 17 illustrates both the removal of upstream carriers 635 as described in the above description for CASE 2 (illustrated in FIG. 15) and the removal of downstream carriers 815 to reduce $C_D$. Note that the removal of overlapping downstream carriers increases the total upstream capacity.

By performing the above-described techniques in either CASE 2 or CASE 3, an echo-cancelled transmission scheme is developed in which the total upstream capacity preferably matches, in most instances, the specified upstream capacity, and the total downstream capacity is at some level equal to or less than the specified downstream capacity. For illustrative purposes, assume that the echo-cancelled transmission scheme developed by performing the aforedescribed techniques is shown by FIG. 15. Before implementing the echo-cancelled transmission scheme for the data phase, a split-band transmission scheme with an adjusted split point, referred to hereafter as the "SB split point adjusted transmission scheme," is preferably developed, and the results of the two transmission schemes are preferably compared to determine which yields the most efficient results. The most efficient transmission scheme is then implemented in the data phase.

In this regard, referring to FIG. 12, a split point may be adjusted from the high end of the upstream band 230 by removing $f_{31}$ and each upstream carrier of a successively lower frequency ($f_{30}, f_{29}, f_{28} \ldots$), thereby decreasing the upstream capacity, until the upstream capacity ($C_U$) reaches the specified upstream capacity. Alternatively, a split point may be adjusted from the low end of the upstream band 230 by removing $f_6$ and each upstream carrier of a successively higher frequency ($f_7, f_8, f_9 \ldots$) until the upstream capacity ($C_U$) reaches the specified upstream capacity. For each removed upstream carrier, a downstream carrier of the same frequency is preferably added. Note that the following equation may be used to calculate the upstream capacity:

$C_U = \Sigma c_{US}(j)$ where $j$ is the index for the remaining split-band upstream vectors.

Note that the addition of the downstream carriers that replaced the removed upstream carriers increases the total downstream capacity. The following equation may be used to calculate the downstream capacity:

$C_D = \Sigma c_{DS}(j)$ where $j$ is the index for all split-band downstream vectors.

Figure 18:
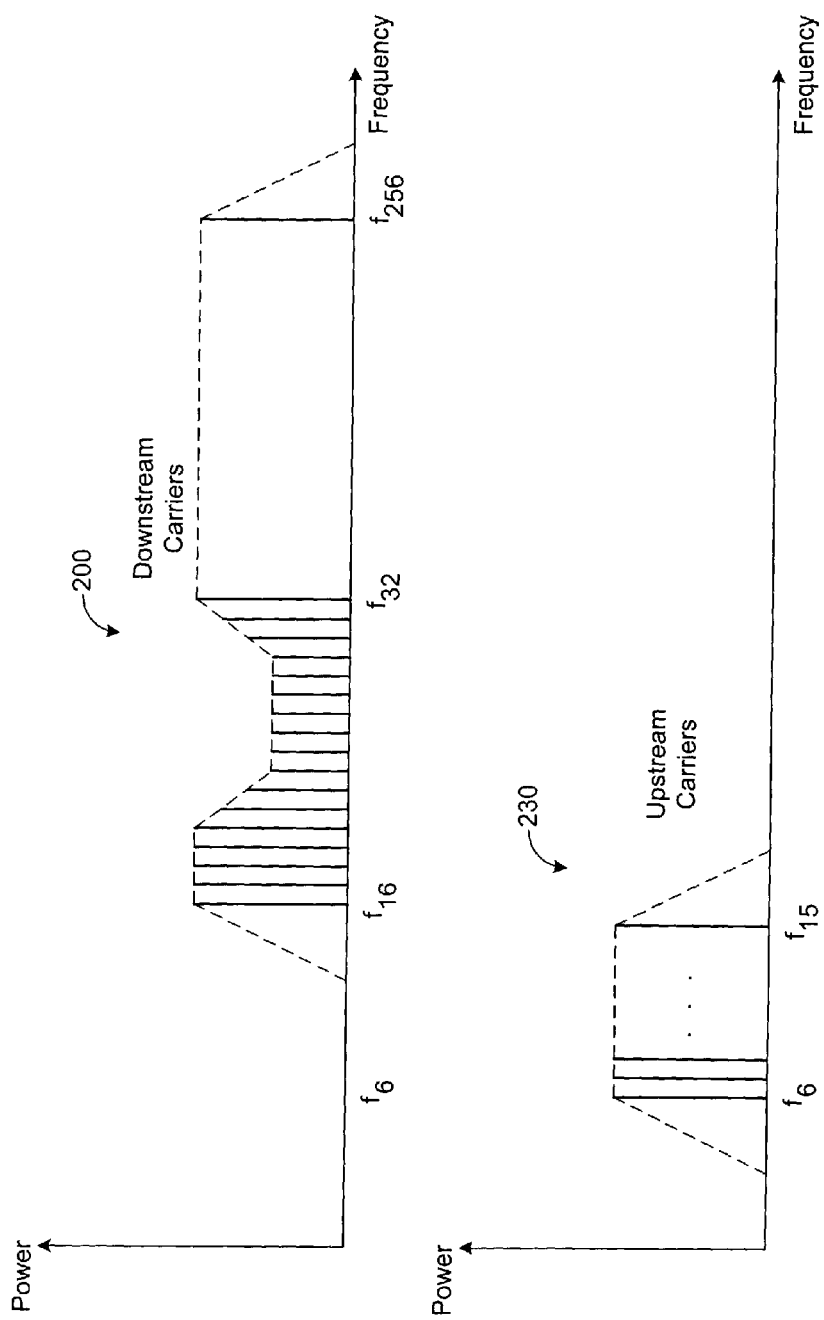
FIG. 18 illustrates the downstream and upstream frequency bands of FIG. 10 once the split point between the bands has been adjusted in an effort to more closely match upstream capacity with a specified upstream capacity.

As an example, assume that upstream carriers $f_{16}$ through $f_{31}$ are removed according to the foregoing techniques, as shown by FIG. 18. In this case, the equation for $C_U$ may be expressed as:

$C_U = \Sigma c_{US}(j)$, for $j=6, 7, 8, \ldots 15$.

The total downstream capacity for this example may be expressed as:

$C_D = \Sigma c_{DS}(j)$, for $j=16, 17, 18, \ldots 256$.

Moreover, once a state is reached such that $C_U$ substantially matches the specified upstream capacity, then $C_D$ is determined. This $C_D$, which represents the downstream capacity for the SB split point adjusted transmission scheme, is then compared to the downstream capacity of the echo-cancelled transmission scheme (FIG. 15) developed according to FIGS. 13 and 14, as described above. For illustrative purposes, assume that the total upstream capacity of the upstream carriers in FIG. 18 substantially matches the specified upstream capacity such that the downstream capacity of the SB split point adjusted transmission scheme corresponds to the CD determined for FIG. 18.

If the downstream capacity of the SB split point adjusted transmission scheme (FIG. 18) exceeds the downstream capacity of the echo-cancelled transmission scheme (FIG. 15), then the SB split point adjusted transmission scheme (FIG. 18) is preferably implemented in the data phase. However, if the downstream capacity of the echo-cancelled transmission scheme (FIG. 15) exceeds the downstream capacity of the SB split point adjusted transmission scheme (FIG. 18), then the echo-cancelled transmission scheme (FIG. 15) is implemented instead.

It should be noted that removal of overlapping downstream carriers affects the upstream capacity, and removal of overlapping upstream carriers affects the downstream capacity. Thus, any time overlapping upstream carriers are removed, it may be desirable to reevaluate the capacity of the downstream carriers to ensure that the total downstream capacity does not exceed the specified downstream capacity, and any time overlapping downstream carriers are removed, it may be desirable to reevaluate the capacity of the upstream carriers to determine whether additional overlapping upstream carriers may be removed in order to further increase downstream capacity.

Furthermore, the present invention has been generally described above as removing overlapping upstream carriers in CASE 2 in an effort to have the upstream substantially match the specified upstream capacity. However, it should be noted that any removal of overlapping upstream carriers generally enhances downstream capacity and may, therefore, be beneficial even if the resulting upstream capacity remains significantly higher than the specified upstream capacity. Thus, having the upstream capacity substantially match the specified level is not a necessary feature of the present invention, but in general, removing overlapping upstream carriers such that the upstream capacity substantially matches the specified upstream capacity is beneficial in that it helps to maximize the downstream capacity.

Figure 19:
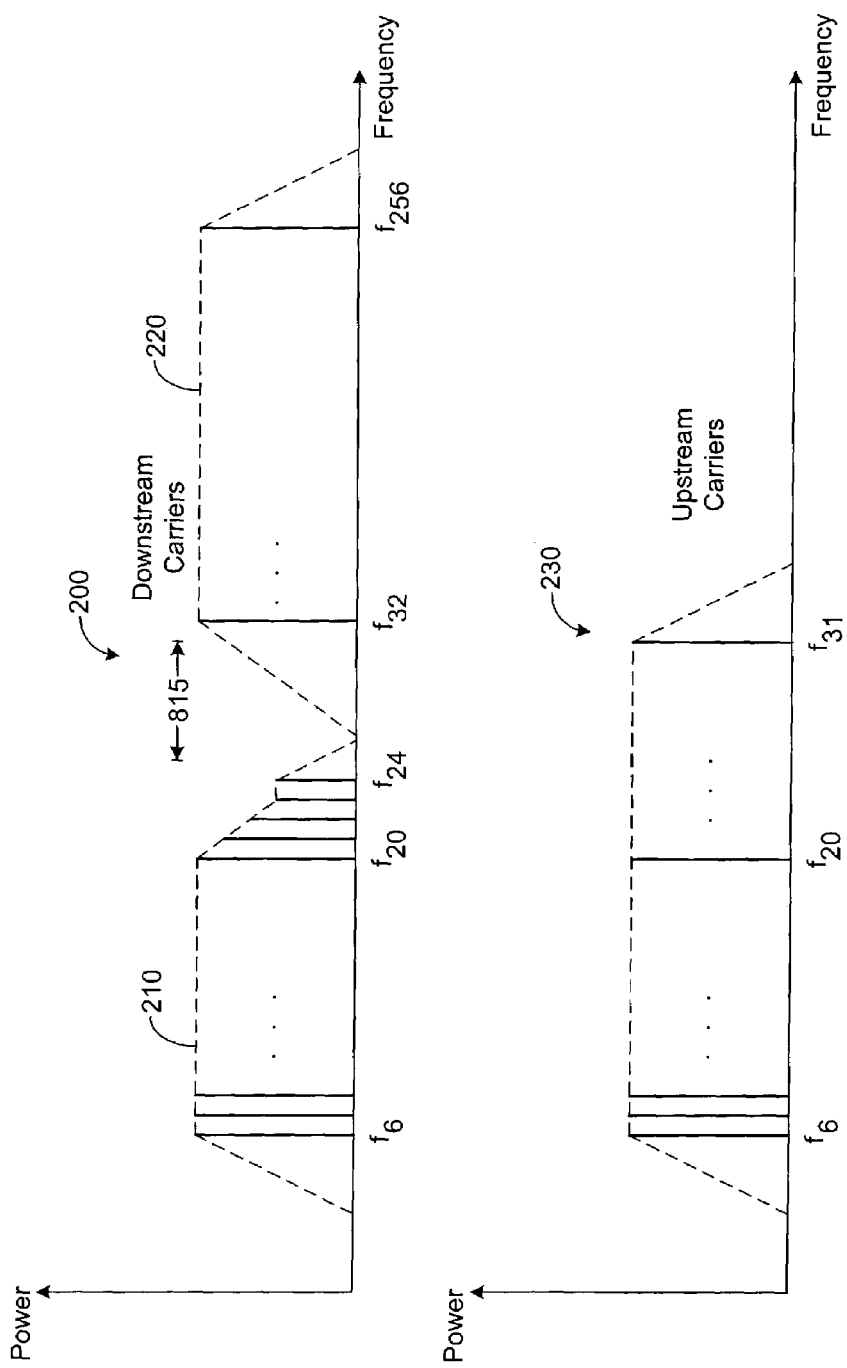
FIG. 19 illustrates the downstream and upstream frequency bands of FIG. 10 after the communication system of FIG. 1 has removed downstream carriers in accordance with a preferred embodiment of the present invention.

In addition, the system 100 of the preferred embodiment has been generally described above as adjusting the frequency bands shown by FIG. 11 in which the reduced power carriers $f_{21}$ through $f_{31}$ are preferably removed before the carrier removal techniques discussed above for the preferred embodiment is implemented. Indeed, the reduced power carriers $f_{21}$ through $f_{31}$ are preferably removed before and are not communicated during the training phase. Note that the frequency spectrum shown by FIG. 11 is compliant with SM5, but in other embodiments, it is not necessary for the carriers $f_{21}$ through $f_{31}$ to be removed prior to implementation of the carrier removal techniques of the preferred embodiment. In such an embodiment, one or more of the reduced power downstream carriers $f_{21}$ through $f_{31}$ may be removed in step 460 (FIG. 13) in order to adjust the capacity of transceivers 110 and/or 120 as desired. For example, the transceiver manager 112 may be configured to remove downstream carrier $f_{31}$ and each downstream carrier of a successively lower frequency (i.e., carriers $f_{29}$, $f_{28}$, $f_{27}$ . . . ) until the downstream capacity of TU-C 110 substantially matches the specified downstream capacity or until the upstream capacity substantially matches the specified upstream capacity. FIG. 19 depicts such an embodiment where the removed portion 815 corresponds to carriers $f_{25}$ through $f_{31}$.

It should also be noted that the present invention has been described above as utilizing discrete multitone (DMT) carriers to communicate between the TU-C 110 and the TU-R 120. Thus, in the embodiments described above, carriers are removed to affect the bandwidth of the transceiver units 110 and 120. However, the principles of the present invention may be utilized to similarly affect the bandwidths of transceiver units that do not communicate via DMT carriers.

In this regard, the bandwidths of non-DMT transceivers (e.g., single carrier transceivers) may be adjusted in the same manner described above in order to enhance downstream and/or upstream capacity. For example, during a training phase, two non-DMT transceivers, according to known techniques, could determine the transmission capacities of the two transceivers and then compare the determined capacities to specified capacities, as described above for the transceiver units 110 and 120. Then, the bandwidth of at least one of the transceivers could be reduced similar to the algorithms described above for reducing the bandwidths of the transceiver units 110 and 120. Various known techniques for adjusting the bandwidths of non-DMT transceiver units may be employed, in lieu of the carrier removal techniques described above, to appropriately set the bandwidths of the non-DMT transceiver units according to the algorithms and techniques set forth herein.

From the foregoing, it will be observed that numerous variations and modifications may be effected without departing from the spirit and scope of the novel concept of the invention. It is to be understood that no limitation with respect to the specific methods and apparatuses illustrated herein is intended or should be inferred. It is, of course, intended to cover by the appended claims all such modifications as fall within the scope of the claims. The invention is further defined by the following claims.

Now, therefore, the following is claimed:

1. A system for controlling a duplex communication session between a first transceiver and a second transceiver interconnected via a communication connection, the transceivers capable of communicating in an echo-cancelled mode and in a split-band mode, and the duplex communication session having a data phase that occurs subsequent to a training phase, the system comprising:

logic configured to determine an echo-cancelled transmission capacity and a split-band transmission capacity of the first transceiver during the training phase, the logic configured to cause the transceivers to communicate in the split-band mode during the data phase if the split-band transmission capacity is less than a specified transmission capacity for the first transceiver, the logic configured to cause the transceivers to communicate in the echo-cancelled mode if the split-band transmission capacity is greater than the specified transmission capacity, the logic further configured to disable one of the transceivers from transmitting at least one overlapping carrier during the data phase based on a comparison of the echo-cancelled transmission capacity to the specified transmission capacity if the split-band transmission capacity is greater than the specified transmission capacity.

2. The system of claim 1, wherein the logic is configured to disable the first transceiver from transmitting at least one overlapping carrier during the data phase in response to a determination that the echo-cancelled transmission capacity is greater than the specified transmission capacity.

3. The system of claim 1, wherein the logic is configured to disable, in response to a determination that the echo-cancelled transmission capacity is greater than the specified transmission capacity, the first transceiver from transmitting a sufficient number of overlapping carriers during the data phase such that a transmission capacity of the first transceiver during the data phase substantially matches the specified transmission capacity.

4. The system of claim 1, wherein the logic is configured to disable the second transceiver from transmitting at least one overlapping carrier during the data phase in response to a determination that the echo-cancelled transmission capacity is less than the specified transmission capacity.

5. The system of claim 1, wherein the logic is configured to disable, in response to a determination that the echo-cancelled transmission capacity is less than the specified transmission capacity, the second transceiver from transmitting a sufficient number of overlapping carriers during the data phase such that a transmission capacity of the first transceiver during the-data phase substantially matches the specified transmission capacity.

6. The system of claim 1, wherein the logic is configured to determine an echo-cancelled transmission capacity of the second transceiver and to determine a split point for a band of contiguous non-overlapping upstream carriers and a band of contiguous non-overlapping downstream carriers such that a total transmission capacity of the first transceiver, when transmitting the non-overlapping upstream carriers, substantially matches the specified capacity, the logic configured to determine a total downstream capacity associated with the second transceiver, the total downstream capacity based on the non-overlapping downstream carriers, the logic further configured to compare the echo-cancelled transmission capacity of the second transceiver with the total downstream capacity, wherein the first transceiver transmits in an upstream direction and the second transceiver transmits in a downstream direction.

7. A method for controlling a duplex communication session between a first transceiver and a second transceiver interconnected via a communication connection, the transceivers capable of communicating in an echo-cancelled mode and in a split-band mode, and the duplex communication session having a data phase that occurs subsequent to a training phase, the method comprising the steps of:
   determining an echo-cancelled transmission capacity and a split-band transmission capacity of the first transceiver during the training phase;
   comparing the split-band transmission capacity to a specified transmission capacity for the first transceiver;
   selecting between the echo-cancelled mode and the split-band mode based on the comparing step;
   implementing the selected mode during the data phase; and
   disabling, in response to a determination that the split-band transmission capacity is greater than the specified transmission capacity, one of the transceivers from transmitting at least one overlapping carrier during the data phase based on a comparison of the echo-cancelled transmission capacity to the specified transmission capacity.

8. The method of claim 7, wherein the disabling step comprises the steps of:
   disabling the first transceiver from transmitting at least one overlapping carrier during the data phase if the echo-cancelled transmission capacity is greater than the specified transmission capacity; and
   disabling the second transceiver from transmitting at least one overlapping carrier during the data phase if the echo-cancelled transmission capacity is less than the specified transmission capacity.

9. The method of claim 7, wherein the disabling step comprises the step of disabling a sufficient number of overlapping carriers such that a transmission capacity of the first transceiver substantially matches the specified transmission capacity.

10. The method of claim 7, further comprising the steps of:
    determining an echo-cancelled transmission capacity of the second transceiver;
    determining a split point for a band of contiguous non-overlapping upstream carriers and a band of contiguous non-overlapping downstream carriers such that a total transmission capacity of the first transceiver, when transmitting the non-overlapping upstream carriers, substantially matches the specified capacity;
    determining a total downstream capacity associated with the second transceiver based on the non-overlapping downstream carriers;
    comparing the echo-cancelled transmission capacity of the second transceiver with the total downstream capacity,
    wherein the first transceiver transmits in an upstream direction and the second transceiver transmits in a downstream direction.

11. A system for controlling a duplex communication session between a first transceiver and a second transceiver interconnected via a communication connection, the duplex communication session having a training phase and a subsequent data phase, comprising:
    logic configured to determine a split-band transmission capacity of the first transceiver during the training phase and to perform a comparison between the split-band capacity and a specified capacity, the logic configured to adjust a split point between a non-overlapping frequency band of the first transceiver and a non-overlapping frequency band of the second transceiver based on the comparison, thereby increasing a split-band transmission capacity of the second transceiver and reducing the split-band transmission capacity of the first transceiver, such that the split-band transmission capacity of the first transceiver substantially matches the specified capacity.

12. A method for controlling duplex communication between a first transceiver and a second transceiver interconnected via a communication connection, the duplex communication session having a training phase and a subsequent data phase, the method comprising the steps of:
    determining a split-band transmission capacity of the first transceiver during the training phase;
    performing a comparison between the split-band capacity and a specified capacity; and
    adjusting a split point between a non-overlapping frequency band of the first transceiver and a non-overlapping band of the second transceiver based on the comparison, thereby increasing a split-band transmission capacity of the second transceiver and reducing the split-band transmission capacity of the first transceiver, such that the split-band transmission capacity of the first transceiver substantially matches the specified capacity.

13. A system for communicating between a first transceiver and a second transceiver, comprising:
    a transmitter;

memory for storing a specified transmission capacity; and
logic configured to communicate carriers between the transceivers and to determine a transmission capacity of one of the transceivers based on a portion of the communicated carriers, the logic configured to perform a comparison between the specified transmission capacity and the determined transmission capacity, the logic further configured to select a plurality of overlapping carriers within the communicated carriers based on the comparison, the logic further configured to disable the transmitter from transmitting the selected carriers, thereby increasing a transmission capacity of the first transceiver and decreasing a transmission capacity of the second transceiver.

14. The system of claim 13, wherein the logic is further configured to disable the transmitter from transmitting each of the selected overlapping carriers in response to a determination that a transmission capacity of the first transceiver is less than a specified transmission capacity for the first transceiver, wherein the transmitter resides within the second transceiver.

15. The system of claim 13, wherein the logic is further configured to disable the transmitter from transmitting each of the selected overlapping carriers in response to a determination that a transmission capacity of the first transceiver is greater than a specified transmission capacity for the first transceiver, wherein the transmitter resides within the first transceiver.

16. The system of claim 13, wherein the logic, in selecting the plurality of overlapping carriers, is configured to select carriers of successively lower frequencies until a desired transmission capacity of the transmitter is reached.

17. The system of claim 13, wherein the logic, in selecting the plurality of overlapping carriers, is configured to select carriers of successively higher frequencies until a desired transmission capacity of the transmitter is reached.

18. A communication method, comprising the steps of:
communicating carriers between a first transceiver and a second transceiver;
determining a transmission capacity of the first transceiver based on a portion of the carriers communicated in the communicating step;
performing a comparison between the determined transmission capacity and a specified transmission capacity for the first transceiver;
identifying overlapping carriers within the communicated carriers; and
disabling, based on the comparison, one of the transceivers from transmitting a sufficient number of the overlapping carriers such that a transmission capacity of the first transceiver substantially matches the specified transmission capacity.

19. The method of claim 18, wherein the disabling step comprises the step of disabling carriers of successively higher frequencies until a transmission capacity of the first transceiver substantially matches the specified transmission capacity.

20. The method of claim 18, wherein the disabling step comprises the step of disabling carriers of successively lower frequencies until a transmission capacity of the first transceiver substantially matches the specified transmission capacity.

21. The method of claim 18, wherein the disabling step comprises the step of disabling the first transceiver from transmitting at least one of the overlapping carriers, thereby reducing a transmission capacity of the first transceiver and increasing a transmission capacity of the second transceiver.

22. The method of claim 18, wherein the disabling step comprises the step of disabling the second transceiver from transmitting at least one of the overlapping carriers, thereby increasing a transmission capacity of the first transceiver and decreasing a transmission capacity of the second transceiver.

23. A system for communicating between a first transceiver and a second transceiver, the first transceiver configured to establish a communication session with the second transceiver over a communication connection, the communication session having a training phase and a data phase, the first transceiver configured to communicate a plurality of carriers during the training phase and to determine a data capacity for each of the plurality of carriers, the system comprising:
memory for storing a specified transmission capacity for the first transceiver; and
logic configured to determine a total transmission capacity of the first transceiver based on carrier data capacities determined in the training phase, the logic configured to perform a comparison between the determined total transmission capacity and the specified total transmission capacity for the first transceiver, the logic further configured to select a contiguous overlapping band of the carriers based on the comparison and to disable one of the transceivers from transmitting each of the carriers within the selected band during the data phase, thereby reducing a transmission capacity of the one transceiver and increasing a transmission capacity of the other transceiver.

24. The system of claim 23, wherein the logic is configured to disable, based on the comparison, the first transceiver from transmitting a sufficient number of overlapping carriers such that a transmission capacity of the first transceiver substantially matches the specified total transmission capacity.

25. The system of claim 23, wherein the logic is configured to disable, based on the comparison, the second transceiver from transmitting a sufficient number of overlapping carriers such that a transmission capacity of the first transceiver substantially matches the specified total transmission capacity.

26. The system of claim 23, wherein the logic, in selecting the contiguous band, is configured to select carriers of successively lower frequencies until a desired transmission capacity for the first transceiver is reached.

27. The system of claim 23, wherein the logic, in selecting the contiguous band, is configured to select carriers of successively higher frequencies until a desired transmission capacity for the first transceiver is reached.

28. A method for establishing communication between transceivers, comprising the steps of:
establishing a communication session between a first transceiver and a second transceiver, the communication session having a training phase and a data phase;
communicating a plurality of overlapping upstream and downstream carriers between the first transceiver and the second transceiver during the training phase;
determining a transmission capacity for the first transceiver based on a portion of the carriers communicated in the communicating step;
comparing the transmission capacity to a specified threshold;
selecting a contiguous band of the overlapping carriers based on the comparing step; and
disabling the first transceiver from transmitting data via carriers within the selected band during the data phase.

29. The method of claim 28, wherein a range of the selected band is based on a difference between the determined transmission capacity and the specified threshold.

30. The method of claim 28, wherein the selecting step includes the step of selecting a first carrier and each carrier of a successively lower frequency until a transmission capacity of the first transceiver for unselected carriers substantially matches the specified capacity.

31. The method of claim 28, wherein the selecting step includes the step of selecting a first carrier and each carrier of a successively higher frequency until a transmission capacity of the first transceiver for unselected carriers substantially matches the specified capacity.

32. The method of claim 31, wherein a frequency of the first carrier corresponds to the highest frequency of the overlapping carriers.

33. An adaptive frequency duplexing method, comprising the steps of:

establishing a full duplex communication session between a first transceiver and a second transceiver, the communication session having a training phase and a data phase;

communicating signals having frequencies within an overlapping bandwidth between the first and second transceivers during the training phase;

determining a transmission capacity of one of the transceivers based on the communicating step;

comparing the transmission capacity to a specified transmission capacity for the one transceiver;

adaptively selecting a contiguous portion of the overlapping bandwidth based on the comparing step; and preventing the one transceiver from transmitting signals having frequencies within the selected portion of the bandwidth during the data phase.

* * * * *